(12) United States Patent
Phillips et al.

(10) Patent No.: US 11,115,777 B2
(45) Date of Patent: *Sep. 7, 2021

(54) LOCATION-BASED SERVICES

(71) Applicant: PAYPAL, INC., San Jose, CA (US)

(72) Inventors: Alan Phillips, Hopkinton, MA (US); Frank Schroth, Milton, MA (US); Geoffrey M. Palmer, Newton, MA (US); Stefan G. Zielinski, Cambridge, MA (US); Allen P. Smith, Milton, MA (US); Colin M. Cunningham, III, Cambridge, MA (US)

(73) Assignee: PayPal, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/714,668

(22) Filed: Dec. 13, 2019

(65) Prior Publication Data

US 2020/0120442 A1    Apr. 16, 2020

Related U.S. Application Data

(60) Continuation of application No. 16/437,756, filed on Jun. 11, 2019, which is a continuation of application
(Continued)

(51) Int. Cl.
*H04W 4/021* (2018.01)
*G08B 21/02* (2006.01)
(Continued)

(52) U.S. Cl.
CPC ........ *H04W 4/021* (2013.01); *G08B 21/0236* (2013.01); *G08B 21/0261* (2013.01);
(Continued)

(58) Field of Classification Search
CPC ..... H04W 4/021; H04W 4/12; G08B 21/0236
(Continued)

(56) References Cited

U.S. PATENT DOCUMENTS

| 5,559,707 A | 9/1996 | Delorme et al. |
| 5,649,114 A | 7/1997 | Deaton et al. |

(Continued)

FOREIGN PATENT DOCUMENTS

EP    1348311 A1    1/2003

OTHER PUBLICATIONS

"Foursquare", Wikipedia, [Online]. Retrieved from the Internet: <http://en.wikipedia.org/wiki/Foursquare>, (Accessed Apr. 16, 2013), 12 pgs.

(Continued)

*Primary Examiner* — Nghi H Ly

(57) ABSTRACT

A method for providing incentives based on geolocation of mobile devices. The method includes storing, by a server, data including merchant information of merchants and points of interest, and associated incentive information. The method includes determining, based on communication with user's device of a user, a first location of the mobile device. The method includes determining, based on the first location, a first subset of merchants and associated first subset of incentives. The method includes communicating merchant data, including information on the first subsets of merchants and incentives, to the mobile device. The method includes communicating to the mobile device, in response to a determination that the mobile device is inside a geofence associated with at least one of the first subset of merchants, additional information on the at least one of the first subset of merchants, the additional information comprising one or more related incentives.

30 Claims, 28 Drawing Sheets

Related U.S. Application Data

No. 15/859,603, filed on Dec. 31, 2017, now Pat. No. 10,321,264, which is a continuation of application No. 14/624,083, filed on Feb. 17, 2015, now abandoned, which is a continuation of application No. 14/534,797, filed on Nov. 6, 2014, now Pat. No. 9,654,923, which is a continuation of application No. 13/361,113, filed on Jan. 30, 2012, now Pat. No. 8,909,248, which is a continuation of application No. 11/690,720, filed on Mar. 23, 2007, now Pat. No. 8,326,315, which is a division of application No. 11/140,273, filed on May 27, 2005, now Pat. No. 7,848,765.

(51) Int. Cl.
*H04W 4/12* (2009.01)
*H04W 4/14* (2009.01)
*H04W 8/10* (2009.01)
*H04W 8/14* (2009.01)
*H04W 92/08* (2009.01)
*G06Q 10/06* (2012.01)

(52) U.S. Cl.
CPC ..... *G08B 21/0269* (2013.01); *G08B 21/0272* (2013.01); *G06Q 10/06311* (2013.01); *H04W 4/12* (2013.01); *H04W 4/14* (2013.01); *H04W 8/10* (2013.01); *H04W 8/14* (2013.01); *H04W 92/08* (2013.01)

(58) Field of Classification Search
USPC ............... 455/456.3, 456.1, 414.1, 418, 421
See application file for complete search history.

(56) References Cited

U.S. PATENT DOCUMENTS

| | | |
|---|---|---|
| 5,724,521 A | 3/1998 | Dedrick |
| 5,724,660 A | 3/1998 | Kauser et al. |
| 5,732,354 A | 3/1998 | Macdonald |
| 5,848,373 A | 12/1998 | DeLorme et al. |
| 5,890,995 A | 4/1999 | Bobick et al. |
| 5,890,068 A | 5/1999 | Fattouche et al. |
| 5,905,246 A | 5/1999 | Fajkowski |
| 5,938,721 A | 8/1999 | Dussell et al. |
| 5,946,687 A | 8/1999 | Gehani et al. |
| 5,948,040 A | 9/1999 | DeLorme et al. |
| 6,014,090 A | 1/2000 | Rosen et al. |
| 6,069,570 A | 5/2000 | Herring et al. |
| 6,091,956 A | 7/2000 | Hollenberg |
| 6,097,958 A | 8/2000 | Bergen |
| 6,108,703 A | 8/2000 | Leighton et al. |
| 6,122,520 A | 9/2000 | Want et al. |
| 6,154,172 A | 11/2000 | Piccionelli et al. |
| 6,157,841 A | 12/2000 | Bolduc et al. |
| 6,167,274 A | 12/2000 | Smith |
| 6,185,598 B1 | 2/2001 | Farber et al. |
| 6,198,927 B1 | 3/2001 | Wright et al. |
| 6,204,812 B1 | 3/2001 | Fattouche |
| 6,208,297 B1 | 3/2001 | Fattouche et al. |
| 6,208,857 B1 | 3/2001 | Agre et al. |
| 6,243,588 B1 | 6/2001 | Koorapaty et al. |
| 6,246,861 B1 | 6/2001 | Messier et al. |
| 6,246,882 B1 | 6/2001 | Lachance |
| 6,259,381 B1 | 7/2001 | Small |
| 6,259,923 B1 | 7/2001 | Lim et al. |
| 6,266,014 B1 | 7/2001 | Fattouche et al. |
| 6,269,361 B1 | 7/2001 | David et al. |
| 6,314,365 B1 | 11/2001 | Smith |
| 6,317,684 B1 | 11/2001 | Roeseler et al. |
| 6,321,158 B1 | 11/2001 | Delorme et al. |
| 6,330,452 B1 | 12/2001 | Fattouche et al. |
| 6,341,255 B1 | 1/2002 | Lapidot |
| 6,347,230 B2 | 2/2002 | Koshima et al. |
| 6,356,543 B2 | 3/2002 | Hall et al. |
| 6,357,042 B2 | 3/2002 | Srinivasan et al. |
| 6,360,101 B1 | 3/2002 | Irvin |
| 6,374,176 B1 | 4/2002 | Schmier et al. |
| 6,374,177 B1 | 4/2002 | Lee et al. |
| 6,404,388 B1 | 6/2002 | Sollenberger et al. |
| 6,424,840 B1 | 7/2002 | Fitch et al. |
| 6,442,529 B1 | 8/2002 | Krishan et al. |
| 6,456,852 B2 | 9/2002 | Bar et al. |
| 6,477,363 B1 | 11/2002 | Ayoub et al. |
| 6,496,857 B1 | 12/2002 | Dustin et al. |
| 6,519,463 B2 | 2/2003 | Tendler |
| 6,529,159 B1 | 3/2003 | Fan et al. |
| 6,552,682 B1 | 4/2003 | Fan |
| 6,553,313 B1 | 4/2003 | Froeberg |
| 6,563,459 B2 | 5/2003 | Takenaga |
| 6,577,946 B2 | 6/2003 | Myr |
| 6,580,914 B1 | 6/2003 | Smith |
| 6,590,529 B2 | 7/2003 | Schwoegler |
| 6,590,533 B2 | 7/2003 | Sollenberger et al. |
| 6,618,593 B1 | 9/2003 | Drutman et al. |
| 6,625,457 B1 | 9/2003 | Raith |
| 6,664,922 B1 | 12/2003 | Fan |
| 6,690,322 B2 | 2/2004 | Shamoto et al. |
| 6,714,797 B1 | 3/2004 | Rautila |
| 6,718,551 B1 | 4/2004 | Swix et al. |
| 6,732,080 B1 | 5/2004 | Blants |
| 6,732,120 B1 | 5/2004 | Du |
| 6,741,188 B1 | 5/2004 | Miller et al. |
| 6,757,544 B2 | 6/2004 | Rangarajan et al. |
| 6,807,479 B2 | 10/2004 | Watanabe et al. |
| 6,819,919 B1 | 11/2004 | Tanaka |
| 7,016,855 B2 | 3/2006 | Eaton et al. |
| 7,077,749 B1 | 7/2006 | Wang |
| 7,082,365 B2 | 7/2006 | Sheha et al. |
| 7,092,702 B2 | 8/2006 | Cronin et al. |
| 7,103,368 B2 | 9/2006 | Teshima |
| 7,119,828 B1 | 10/2006 | Kizhnerman et al. |
| 7,130,622 B2 | 10/2006 | Vänskä et al. |
| 7,138,913 B2 | 11/2006 | Mackenzie et al. |
| 7,142,858 B2 | 11/2006 | Aoki et al. |
| 7,164,986 B2 | 1/2007 | Humphries et al. |
| 7,196,639 B2 | 3/2007 | Joyce et al. |
| 7,197,719 B2 | 3/2007 | Doyle et al. |
| 7,199,815 B2 | 4/2007 | Aoyama |
| 7,203,502 B2 | 4/2007 | Wilson et al. |
| 7,203,598 B1 | 4/2007 | Whitsell |
| 7,213,214 B2 | 5/2007 | Baar et al. |
| 7,216,109 B1 | 5/2007 | Donner |
| 7,228,287 B1 | 6/2007 | Samson et al. |
| 7,233,913 B2 | 6/2007 | Scroggie et al. |
| 7,246,109 B1 | 7/2007 | Ramaswamy |
| 7,254,388 B2 | 8/2007 | Nam et al. |
| 7,273,172 B2 | 9/2007 | Olsen, III et al. |
| 7,385,499 B2 | 6/2008 | Horton et al. |
| 7,389,919 B2 | 6/2008 | Walker et al. |
| 7,435,179 B1 | 10/2008 | Ford |
| 7,502,133 B2 | 3/2009 | Fukunaga et al. |
| 7,532,899 B2 | 5/2009 | Wilson et al. |
| 7,593,871 B1 | 9/2009 | Mesaros |
| 7,657,436 B2 | 2/2010 | Elmore et al. |
| 7,668,931 B2 | 2/2010 | Parupudi et al. |
| 7,669,759 B1 | 3/2010 | Zettner |
| 7,706,740 B2 | 4/2010 | Collins et al. |
| 7,715,981 B2 | 5/2010 | Bradley et al. |
| 7,720,436 B2 | 5/2010 | Hamynen et al. |
| 7,720,844 B2 | 5/2010 | Chu et al. |
| 7,730,485 B2 * | 6/2010 | Walter ............... G06Q 10/087 235/383 |
| 7,747,259 B2 | 6/2010 | Pande et al. |
| 7,751,971 B2 | 7/2010 | Chang et al. |
| 7,757,544 B2 | 7/2010 | Huang et al. |
| 7,780,522 B2 | 8/2010 | Lutnick et al. |
| 7,807,479 B1 | 10/2010 | Lindsey et al. |
| 7,819,919 B2 | 10/2010 | Fell |
| 7,848,765 B2 | 12/2010 | Phillips et al. |
| 7,909,326 B2 | 3/2011 | Walker et al. |
| 8,010,279 B2 | 8/2011 | Kobuya et al. |
| 8,041,604 B1 | 10/2011 | Glaser |

(56) References Cited

U.S. PATENT DOCUMENTS

| | | |
|---|---|---|
| 8,045,962 B2 | 10/2011 | Schullian et al. |
| 8,099,109 B2 | 1/2012 | Altman et al. |
| 8,249,884 B2 | 8/2012 | Turner et al. |
| 8,326,315 B2 | 12/2012 | Phillips et al. |
| 8,355,948 B2 | 1/2013 | Mason |
| 8,371,502 B1 | 2/2013 | Galit et al. |
| 8,423,408 B1 | 4/2013 | Barnes et al. |
| 8,463,295 B1 | 6/2013 | Caralis et al. |
| 8,549,028 B1 | 10/2013 | Alon et al. |
| 8,566,197 B2 | 10/2013 | Satyavolu et al. |
| 8,732,019 B2 | 5/2014 | Brown et al. |
| 8,862,150 B2 | 10/2014 | Phillips et al. |
| 8,909,248 B2 | 12/2014 | Phillips et al. |
| 9,251,536 B2 | 2/2016 | Caralis et al. |
| 9,654,923 B2 | 5/2017 | Phillips et al. |
| 9,668,096 B2 | 5/2017 | Philips et al. |
| 10,321,264 B2 | 6/2019 | Phillips et al. |
| 2001/0009547 A1* | 7/2001 | Jinzaki ............... H04L 12/40071 370/390 |
| 2001/0015965 A1 | 8/2001 | Preston et al. |
| 2001/0055976 A1 | 12/2001 | Crouch et al. |
| 2002/0046259 A1 | 4/2002 | Glorikian |
| 2002/0055924 A1 | 5/2002 | Liming |
| 2002/0065689 A1 | 5/2002 | Bingham et al. |
| 2002/0067308 A1 | 6/2002 | Robertson |
| 2002/0078444 A1 | 6/2002 | Krewin et al. |
| 2002/0082941 A1 | 6/2002 | Bird |
| 2002/0111154 A1 | 8/2002 | Eldering et al. |
| 2002/0115453 A1 | 8/2002 | Poulin et al. |
| 2002/0119819 A1 | 8/2002 | Kunzle et al. |
| 2002/0143930 A1 | 10/2002 | Babu et al. |
| 2002/0145984 A1 | 10/2002 | Babu et al. |
| 2002/0155844 A1 | 10/2002 | Rankin et al. |
| 2002/0160766 A1 | 10/2002 | Portman et al. |
| 2002/0198003 A1 | 12/2002 | Klapman |
| 2003/0004802 A1 | 1/2003 | Callegari |
| 2003/0007006 A1 | 1/2003 | Baar et al. |
| 2003/0037041 A1 | 2/2003 | Hertz |
| 2003/0040324 A1 | 2/2003 | Eldering et al. |
| 2003/0046158 A1 | 3/2003 | Kratky |
| 2003/0055726 A1 | 3/2003 | Sohya et al. |
| 2003/0061110 A1 | 3/2003 | Bodin |
| 2003/0063128 A1 | 4/2003 | Salmimaa |
| 2003/0098892 A1 | 5/2003 | Hiipakka |
| 2003/0125043 A1 | 7/2003 | Silvester et al. |
| 2003/0126150 A1 | 7/2003 | Chan et al. |
| 2003/0130787 A1 | 7/2003 | Clapper |
| 2003/0134645 A1 | 7/2003 | Stern |
| 2003/0139190 A1 | 7/2003 | Steelberg et al. |
| 2003/0151501 A1 | 8/2003 | Teckchandani et al. |
| 2003/0195044 A1 | 10/2003 | Narita |
| 2003/0197740 A1 | 10/2003 | Reponen |
| 2003/0200272 A1* | 10/2003 | Campise ............... H04L 51/28 709/206 |
| 2003/0208409 A1 | 11/2003 | Mault |
| 2003/0216960 A1 | 11/2003 | Postrel |
| 2003/0220835 A1 | 11/2003 | Barnes, Jr. |
| 2003/0222820 A1 | 12/2003 | Karr et al. |
| 2004/0002359 A1 | 1/2004 | Deas et al. |
| 2004/0021567 A1 | 2/2004 | Dunn |
| 2004/0023666 A1 | 2/2004 | Moon et al. |
| 2004/0030598 A1 | 2/2004 | Boal |
| 2004/0039579 A1 | 2/2004 | Chithambaram et al. |
| 2004/0043773 A1 | 3/2004 | Lee et al. |
| 2004/0048605 A1 | 3/2004 | Schaefer |
| 2004/0111332 A1 | 6/2004 | Baar et al. |
| 2004/0139330 A1 | 7/2004 | Baar |
| 2004/0142750 A1 | 7/2004 | Glisson et al. |
| 2004/0192339 A1 | 9/2004 | Wilson et al. |
| 2004/0192349 A1 | 9/2004 | Reilly |
| 2004/0203863 A1 | 10/2004 | Huomo |
| 2004/0203901 A1 | 10/2004 | Wilson et al. |
| 2004/0203931 A1 | 10/2004 | Karaoguz |
| 2004/0207513 A1 | 10/2004 | Nageli |
| 2004/0229631 A1 | 11/2004 | George |
| 2004/0248569 A1 | 12/2004 | Kondou |
| 2004/0266457 A1 | 12/2004 | Dupray |
| 2005/0044032 A1 | 2/2005 | Lee et al. |
| 2005/0064852 A1 | 3/2005 | Baldursson |
| 2005/0065916 A1 | 3/2005 | Ge et al. |
| 2005/0090231 A1 | 4/2005 | Huberman |
| 2005/0156715 A1 | 7/2005 | Zou et al. |
| 2005/0159883 A1 | 7/2005 | Humphries |
| 2005/0250516 A1 | 11/2005 | Shim |
| 2005/0278749 A1 | 12/2005 | Ewert |
| 2006/0026170 A1 | 2/2006 | Kreitler et al. |
| 2006/0035647 A1 | 2/2006 | Eisner et al. |
| 2006/0047825 A1 | 3/2006 | Steenstra et al. |
| 2006/0064346 A1 | 3/2006 | Steenstra et al. |
| 2006/0089792 A1 | 4/2006 | Manber et al. |
| 2006/0098028 A1 | 5/2006 | Baar |
| 2006/0099959 A1 | 5/2006 | Staton et al. |
| 2006/0145837 A1 | 7/2006 | Horton et al. |
| 2006/0148488 A1 | 7/2006 | Syrbe |
| 2006/0277564 A1 | 7/2006 | Jarman et al. |
| 2006/0211453 A1 | 9/2006 | Schick |
| 2006/0218114 A1 | 9/2006 | Weare et al. |
| 2006/0224583 A1 | 10/2006 | Fikes et al. |
| 2006/0236257 A1 | 10/2006 | Othmer et al. |
| 2006/0238379 A1 | 10/2006 | Kimchi et al. |
| 2006/0270421 A1 | 11/2006 | Phillips et al. |
| 2006/0271281 A1 | 11/2006 | Ahn et al. |
| 2006/0271501 A1 | 11/2006 | Mazzella et al. |
| 2007/0015517 A1 | 1/2007 | Casey |
| 2007/0024469 A1 | 2/2007 | Chou |
| 2007/0037582 A1 | 2/2007 | Mohi et al. |
| 2007/0083437 A1 | 4/2007 | Hamor |
| 2007/0100802 A1 | 5/2007 | Celik |
| 2007/0118430 A1 | 5/2007 | Wiseman et al. |
| 2007/0124229 A1 | 5/2007 | Ku et al. |
| 2007/0143013 A1 | 6/2007 | Breen |
| 2007/0165050 A1 | 7/2007 | Baar |
| 2007/0202844 A1 | 8/2007 | Wilson et al. |
| 2007/0222734 A1 | 9/2007 | Tran |
| 2007/0244633 A1 | 10/2007 | Phillips et al. |
| 2007/0281689 A1 | 12/2007 | Altman et al. |
| 2007/0281716 A1 | 12/2007 | Altman et al. |
| 2007/0287477 A1 | 12/2007 | Tran |
| 2008/0035725 A1 | 2/2008 | Jambunathan et al. |
| 2008/0040216 A1 | 2/2008 | Dellovo |
| 2008/0045234 A1 | 2/2008 | Reed |
| 2008/0046415 A1 | 2/2008 | Henkin et al. |
| 2008/0070588 A1 | 3/2008 | Morin |
| 2008/0102947 A1 | 5/2008 | Hays et al. |
| 2008/0102957 A1 | 5/2008 | Burman et al. |
| 2008/0104542 A1 | 5/2008 | Cohen et al. |
| 2008/0126251 A1 | 5/2008 | Wassingbo |
| 2008/0126515 A1 | 5/2008 | Chambers et al. |
| 2008/0162034 A1 | 7/2008 | Breen |
| 2008/0177749 A1 | 7/2008 | Overton |
| 2008/0195312 A1 | 8/2008 | Aaron et al. |
| 2008/0200251 A1 | 8/2008 | Alderucci et al. |
| 2008/0248815 A1 | 10/2008 | Busch |
| 2008/0251580 A1 | 10/2008 | Van De Velde et al. |
| 2008/0290987 A1 | 11/2008 | Li |
| 2008/0313078 A1 | 12/2008 | Payne |
| 2009/0005077 A1 | 1/2009 | Forstall et al. |
| 2009/0024476 A1 | 1/2009 | Baar et al. |
| 2009/0033633 A1 | 2/2009 | Newman et al. |
| 2009/0037101 A1 | 2/2009 | Koike et al. |
| 2009/0061884 A1 | 3/2009 | Rajan et al. |
| 2009/0063229 A1 | 3/2009 | Coladonato et al. |
| 2009/0076911 A1 | 3/2009 | Vo et al. |
| 2009/0076925 A1 | 3/2009 | Dewitt et al. |
| 2009/0100037 A1 | 4/2009 | Scheibe |
| 2009/0132961 A1 | 5/2009 | Baar |
| 2009/0156182 A1 | 6/2009 | Jenkins et al. |
| 2009/0156234 A1 | 6/2009 | Sako et al. |
| 2009/0197616 A1 | 8/2009 | Lewis et al. |
| 2009/0204672 A1 | 8/2009 | Jetha et al. |
| 2009/0234861 A1 | 9/2009 | Ramer et al. |
| 2009/0239552 A1 | 9/2009 | Churchill et al. |
| 2009/0276309 A1 | 11/2009 | Otto et al. |
| 2009/0306886 A1 | 12/2009 | Mueller |

(56) References Cited

U.S. PATENT DOCUMENTS

| | | |
|---|---|---|
| 2010/0049609 A1 | 2/2010 | Zhao et al. |
| 2010/0114683 A1 | 5/2010 | Wessels et al. |
| 2011/0047075 A1 | 2/2011 | Fourez |
| 2011/0106605 A1 | 5/2011 | Malik et al. |
| 2011/0212717 A1 | 9/2011 | Rhoads et al. |
| 2012/0036015 A1 | 2/2012 | Sheikh |
| 2012/0126974 A1 | 5/2012 | Phillips et al. |
| 2012/0129553 A1 | 5/2012 | Phillips et al. |
| 2012/0143684 A1 | 6/2012 | Park et al. |
| 2012/0239483 A1 | 9/2012 | Yankovich et al. |
| 2012/0239501 A1 | 9/2012 | Yankovich et al. |
| 2013/0080239 A1 | 3/2013 | Okerlund |
| 2013/0110624 A1 | 5/2013 | Mitrovic |
| 2013/0150086 A1 | 6/2013 | Caralis et al. |
| 2013/0173377 A1 | 7/2013 | Keller et al. |
| 2013/0346233 A1 | 12/2013 | Caralis et al. |
| 2015/0006291 A1 | 1/2015 | Yankovich et al. |
| 2015/0032531 A1 | 1/2015 | Yankovich et al. |
| 2015/0065177 A1 | 3/2015 | Phillips et al. |
| 2015/0148078 A1 | 5/2015 | Phillips et al. |
| 2015/0163632 A1 | 6/2015 | Phillips et al. |
| 2018/0124564 A1 | 5/2018 | Phillips et al. |
| 2019/0373402 A1 | 12/2019 | Phillips et al. |
| 2019/0373406 A1 | 12/2019 | Phillips et al. |
| 2019/0380000 A1 | 12/2019 | Phillips et al. |
| 2019/0380001 A1 | 12/2019 | Phillips et al. |
| 2019/0380002 A1 | 12/2019 | Phillips et al. |

OTHER PUBLICATIONS

"Halfbakery: Buddy Locator", [Online]. Retrieved from the Internet: <URL: http://www.halfbakerv.com/idea/Buddy 20Locator#1055455737>, (Jun. 11, 2003), 2 pgs.

"Halfbakery: Mobile phone utility", [Online]. Retrieved from the Internet: <URL: http://www.halfbakerv.com/idea/mobile 20phone 20utility#1073585857>, (Jan. 8, 2004), 2 pgs.

"Halfbakery: Mobile Proximity Link", [Online]. Retrieved from the Internet: <URL: http://www.halfbakery.com/idea/Mobile_20Proximity_ 20Link#1001923289>, (Sep. 30, 2001), 2 pgs.

"Networks in Motion Named Semi-Finalist for Wireless LBS Challenge", [Online]. Retrieved from the Internet: <URL: http://www.tmcnet.com/usubmiU2004/Mar/1025200.htm>, (Mar. 18, 2004), 1 pg.

"Proposal for free, open source cell phone location service", 90% Crud, [Online]. Retrieved from the Internet: <UrRL: http://george.hotelli ng.net/90percent/geekery/proposal_for_free_open_source_ eel I_phone location service.php>, (Mar. 6, 2004), 1 pg.

"SignalSoft Corporation awarded location-based services patent", [Online]. Retrieved from the Internet: <URL: http://www.eel I u lar.co.za/news 2001/04282001-sig nalsoft-patent.htm>, (Apr. 27, 2001), 1 pg.

Carpendale, Marianne S.T, "A Framework for Elastic Presentation Space", Burnaby, British Columbia, Simon Fraser University, (1999), 296 pgs.

Keath, Jason, "21 Unique Location Examples from Foursquare", Gowalla, Whrrl, and MyTown, Socialfresh.com, (Jun. 1, 2010), 9 pgs.

Manninen, JP, ""Geofencing" enables new location-based apps, raises privacy concerns.", VentureBeat, [Online]. Retrieved from the Internet: <URL: http://venturebeat.com/20 10/04/23/geofencing -pushes-services-to-phones/>, (Apr. 23, 2010), 4 pgs.

Yankovich, Steve, et al., "Targeted Incentive Actions Based on Location and Intent", U.S. Appl. No. 13/050,769, filed Mar. 17, 2011, 47 pgs.

U.S. Appl. No. 16/706,654, filed Dec. 6, 2019, Location-Based Services.

U.S. Appl. No. 16/706,656, filed Dec. 6, 2019, Location-Based Services.

U.S. Appl. No. 16/706,658, filed Dec. 6, 2019, Location-Based Services.

U.S. Appl. No. 16/706,661, filed Dec. 6, 2019, Location-Based Services.

U.S. Appl. No. 16/706,665, filed Dec. 6, 2019, Location-Based Services.

\* cited by examiner

| STOP | TIME | DURATION | LOCATION | DIRECTION/ SPEED | DISTANCE (MILES) |
|---|---|---|---|---|---|
| 3 | 11/03/04 – 1:19 PM – 1:23 PM<br>11/03/04 – 12:34 PM | 0:03 | uLOCATE OFFICE<br>ROUTE 9, NATICK, MA | NW AT 0 MPH | 3.84 |
| 2 | 11/03/04 – 8:50 AM – 8:58 AM<br>11/03/04 – 8:46 AM<br>11/03/04 – 8:35 AM<br>11/03/04 – 8:27 AM | 0:03 | uLOCATE OFFICE<br>154 COMMONWEALTH RD, WAYLAND, MA<br>ROUTE 30, AUBURNDALE, MA<br>HOMER ST, NEWTON CENTER, MA | N AT 0 MPH<br>W AT 30 MPH<br>N AT 0 MPH | 11.69 |
| 1 | 11/03/04 – 7:54 AM – 8:09 AM | 0:14 | 874, WALNUT ST, NEWTON CENTER, MA | | 0.00 |

| LOCATION | ADDRESS BOOK | | |
|---|---|---|---|
| ADDRESS BOOK > SAVE LOCATIONS > ALL | | | |
| LOCATION | ADDRESS | | |
| GEOFF'S HOME | 14 BUSWELL PARK<br>NEWTON, MA 02458 | EDIT | DELETE |
| HOME | 16 BAY COLONY DR<br>ASHLAND, MA 01721 | EDIT | DELETE |
| uLOCATE'S OFFICE | 148 SPEEN ST<br>FRAMINGHAM, MA 01701 | EDIT | DELETE |

> ADD LOCATION

POWERED BY uLOCATE COMMUNICATIONS

*FIG. 34*

ALERT FOR ULOCATE TEST

| LOCATION | PHONE | EVENT | ALERT CONTACTS | |
|---|---|---|---|---|
| uLOCATE OFFICE | ALAN | <=> | SMS: ALAN<br>EMAIL: JEREMY EMAIL | EDIT \| DELETE |
| uLOCATE OFFICE | GEOFF | <=> | EMAIL: NINA | EDIT \| DELETE |
| uLOCATE OFFICE | ALAN | <=> | SMS: ALAN<br>EMAIL: ALAN'S EMAIL<br>EMAIL: FRANK'S EMAIL<br>EMAIL: ALAN'S WORK EMAIL | EDIT \| DELETE |
| FRANK'S HOME | MAO | <=> | EMAIL: FRANK'S EMAIL | EDIT \| DELETE |
| FRANK'S HOME | FRANK | <=> | EMAIL: FRANK'S EMAIL | EDIT \| DELETE |
| uLOCATE OFFICE | STEFAN UMAM | <=> | SMS: STEFAN'S SMS<br>EMAIL: ALAN'S EMAIL<br>EMAIL: FRANK'S EMAIL | EDIT \| DELETE |

CREATE NEW ALERT

*FIG. 36*

LOCATION-BASED SERVICES

CROSS-REFERENCE TO RELATED APPLICATIONS

This application is a continuation of U.S. patent application Ser. No. 16/437,756, filed Jun. 11, 2019; which is a continuation of U.S. patent application Ser. No. 15/859,603, filed on Dec. 31, 2017, now U.S. Pat. No. 10,321,264, issued on Jun. 11, 2019; which is a continuation of U.S. patent application Ser. No. 14/624,083, filed on Feb. 17, 2015; which is a continuation of U.S. patent application Ser. No. 14/534,797, filed on Nov. 6, 2014, now U.S. Pat. No. 9,654,923, issued on May 16, 2017; which is a continuation of U.S. patent application Ser. No. 13/361,113, filed on Jan. 30, 2012, now U.S. Pat. No. 8,909,248, issued on Dec. 9, 2014; which is a continuation of U.S. patent application Ser. No. 11/690,720, filed on Mar. 23, 2007, now U.S. Pat. No. 8,326,315, issued on Dec. 4, 2012; which is a divisional of U.S. patent application Ser. No. 11/140,273, filed on May 27, 2005, now U.S. Pat. No. 7,848,765, issued on Dec. 7, 2010; the disclosures of which are incorporated herein by reference in their entireties.

BACKGROUND

Field of the Invention

This invention relates to the field of location-based services, and more particularly to the field of location-based services involving portable electronic facilities.

Description of the Related Art

Location systems have been developed for determining and tracking the locations of the users of mobile devices such as cellular phones, including global positioning systems (GPS), as well as various triangulation systems that use cellular telephone signals, broadcast television signals, or the like. Dead reckoning systems also exist for determining locations of devices based on movement in reference to a set of known coordinates. However, to date the uses of such systems have been limited. A need exists for improved systems for using location-based information for a variety of purposes.

SUMMARY

A variety of methods and systems are disclosed herein that include the capability of tracking mobile devices, such as cellular phones. In various embodiments, the present invention may provide an adaptable user interface, which may transmit a current location of a portable electronic facility, such as to another device or system and may receive an electronic storage file or other indication of the current location of the portable electronic facility. The file or message may contain code the enables a specific user interface capability for the portable electronic facility, so that it displays a version of the user interface based on the contents of the electronic storage file, message or other contents. The portable electronic facility may take various forms, such as, without limitation, a mobile phone, a GPS enabled mobile phone, a CDMA enabled mobile phone, a GPRS enabled mobile phone, a mobile phone with a camera, a mobile phone with browser capabilities, a GPS unit, a tracking unit, a portable electronic device with a compass, a laptop computer, a personal digital assistant, an MP3 player, a camera, a handheld device, a pager, and/or a portable gaming device. The portable electronic facility may be wearable.

The storage file may be transmitted from a remote location and may without limitation be in a format such as an XML document, a script, an HTML document, a program, a database, a table, a message, a folder, an application, an animation and/or a text file. The storage file may contain user interface information, such as specific menus that may be for a specific location and/or specific allocations that may be for a specific location. The storage file may be updatable, wherein the user may manually update the storage file with information or wherein the storage file may be automatically updated with information. The update may occur when a user stops at a location. The user may modify the interface. The adaptable user interface may produce results, such as an answer to a user's query.

An adaptable user interface may provide for receiving location-based information associated with the portable electronic facility and outputting a version of such information through the portable electronic facility. The information may be received in response to a transmission of the location of the portable electronic facility. The output version of such information may without limitation be visual, audio, a facsimile, an email, voice, a light, a change in the intensity of a light, a change in the color of a light, via SMS, via an instant message, via a text message, and/or an application that may only be available at certain locations. In some embodiments, at least one menu item may be changed in response to the information.

The information may be defined in relation to an object and/or a location. The information may be a geocentric list. The information may be specific to a user and may without limitation alter the look and feel of the facility, alter the functionality of the facility, be in an XML, format, be in a database format, and/or be in a text file format. An alert, which may relate to an item on a list, may be triggered in response to the information.

The present invention may provide for location tracking, wherein a location of a portable electronic facility may be transmitted, stored in a file, stored with other information in the portable electronic facility, and reported along with an indication of the movement of the portable electronic facility. The information itself may be displayed on a map and may comprise an indication of speed and/or direction.

The present invention may provide business information by storing the location of a plurality of portable electronic facilities, possibly in an electronic storage file or a location-containing file, which may be remote. The invention may provide access to the storage file, which may contain information pertaining to demographics, locations and motion of the portable electronic facilities. Access to the storage file or information may be password protected and the storage file or information may be encrypted. The storage file may be an XML document, a database, a table or a text file.

The invention may provide demographic information associated with the portable electronic facilities. Tracking information may constitute traffic patterns.

The present invention may provide methods and systems for effecting change on a portable electronic facility in response to location information. The method may involve receiving location information on the portable electronic facility and effecting a change on the portable electronic facility based on the location information. The change may involve activating the portable electronic device, powering off portable electronic device, placing the portable electronic device in standby mode, starting an application, stopping an application or the output of information. The output may involve audio, video, a picture related a location, fax, email, instant message, text message, SMS, internet protocol, voice, voicemail, vibration, stimulation at least one of the five senses or an alert. The alert may involve fax, email, instant message, text message, SMS, internet protocol, voice, voicemail, vibration or stimulation of at least one of the five senses.

The change may involve a reminder regarding an item on a list and the list may be a geocentric list. The change may involve a change to at least one item on a menu. The change may affect the availability of an application. The change may also involve enabling free calling when within a certain geofence, such as within a home or a user-defined geofence.

The location information may relate to the accuracy of the location information. The information may refresh continuously, in accordance with set preferences or in response to a request. The frequency of the requests may be varied in response to speed, location, specified preferences, proximity to a point of interest, or changes in a geofence. A user may make a request, such as a request for help, such as in response to pressing a panic button or activating a panic mode on a portable electronic facility.

The present invention may provide for methods and systems of triggering the output of location-based information involving receiving information via a portable electronic facility and outputting location-based information based on the received information. The information may be received via a sensor, which may measure the parameters of a device, facility or vehicle.

The present invention may provide methods and systems for location determination involving capturing characteristics of a location using a portable electronic facility, transmitting those characteristics and receiving location based information. The characteristics may be captured as a picture, a photograph, verbally or using at least one sensor. The characteristics may be transmitted via SMS, fax, email, instant message, text message, internet protocol, voice, voicemail, GPRS, CDMA, WAP protocol, internet, text or as a file.

The present invention may provide methods and systems of varying transmissions for a portable electronic facility involving varying information transmissions to a portable electronic facility and varying information transmissions from a portable electronic facility. The length or frequency of the transmissions may be varied. The variation may be in response to velocity, direction, location, a point of interest, an object, preferences, a location with respect to a geofence or changes in a geofence. The variation may result in increased battery life for the portable electronic facility. The data may be stored and transmitted all at one or it may be transmitted as it is updated.

The present invention may provide methods and systems of increasing the quality of location based information for a portable electronic facility, involving varying information transmissions to a portable electronic facility and varying information transmissions from a portable electronic facility. The length or frequency of the transmissions may be varied. The variation may be in response to velocity, direction, location, a point of interest, an object, preferences, a location with respect to a geofence or changes in a geofence.

In an embodiment the information transmissions may be from multiple sources. The multiple sources may be different networks or different means of communication. The means of communication may be SMS, fax, email, instant message, internet protocol, voice, voicemail, GPRS, CDMA, WAP protocol, internet or text. The information may be transmitted in a costless manner, a cost reduced manner or in the form of a DNS lookup.

The present invention may provide methods and systems of increasing the quality of location based information for a portable electronic facility involving obtaining multiple data points for a given item of information or a location. The multiple data points may be analyzed and outliers dropped. The analysis may be performed using an algorithm. The item of information may relate to location, velocity or direction.

The present invention may provide methods and systems of defining a geofence on a portable electronic facility involving inputting the geofence using the portable electronic facility. The center and a radius of a geofence may be entered on the portable electronic facility. The geofence may be defined using a cursor on the display of the portable electronic facility. The geofence may be defined using a touch screen on the portable electronic facility. The geofence may be defined by the location of the portable electronic facility. The geofence may be defined by placing the portable electronic facility at certain points comprising the geofence. The geofence may be defined in real time by placing the portable electronic facility at certain points comprising the geofence. The geofence may be manipulated using the portable electronic facility. The geofence may be moved using the display of the portable electronic facility. The geofence may be moved using the portable electronic facility. The geofence may be a circle, a sphere, in the shape of any closed polygon, a closed volume, in two dimensions, in three dimensions or may travel with a person.

The present invention may provide methods and systems of defining a geofence on a computer screen involving inputting the geofence through a user interface. The geofence may be defined or moved about the interface using a pointing device such as a mouse or stylus. The radius, shape or dimensions of the geofence may also be defined or changed using a pointing device such as a mouse or stylus.

The present invention may provide methods and systems of sending location-based alerts involving determining the location of a portable electronic facility and sending an alert based on the location of the portable electronic facility. The alert may be in response to the location of a portable electronic facility with respect to a geofence. The alert may be via audio, video, fax, email, instant message, text message, SMS, internet protocol, voice, voicemail, vibration or may stimulate at least one of the five senses. The alert may be communicated via one of the following means of communication: SMS, fax, email, instant message, internet protocol, voice, voicemail, GPRS, CDMA, WAP protocol, internet or text.

The present invention may provide methods and systems of analyzing information related to at least one portable electronic facility involving transmitting information from the at least one portable electronic facility and analyzing such information using an analysis engine. The information from one or more portable electronic facilities may be stored or aggregated. The analysis engine may provide the ability to view location history or analyze location history. The analysis engine may also request additional information or send alerts. The analysis engine may perform analytics on location information such as demographic analysis, predictive analysis and descriptive analysis. The information provided by the analysis engine may include purchasing information, personal preferences, demographics or consumer purchasing data relating to individual consumers or classes of consumers.

Access to the analysis engine, the system and information may be granted at different access levels. A user may be granted partial or restricted access via a guest login. It may be that whether a user is permitted to know the location of another user is determined based on the access levels of the users.

Methods and systems disclosed herein may include methods and systems for verifying a transaction using a portable electronic facility. Methods and systems disclosed herein may include methods and systems for tailoring information to the behavior of a user, such as observing the behavior of a user and communicating information to the user by a portable electronic facility, such as information based on the observed behavior of a user. Methods and systems disclosed herein may include methods and systems for providing information to a portable electronic facility based on information received from the portable electronic facility, including location information. A network of portable electronic facilities may be provided, allowing communication among portable electronic facilities, including information based on the tracked locations of the portable electronic facilities. In embodiments information is communicated directly among the portable electronic facilities, without use of a central server. Information may be communicated by SMS, fax, email, instant message, internet protocol, voice, voicemail, GPRS, CDMA, WAP protocol, internet and/or text.

Several possible graphical user interfaces may be presented on a portable electronic facility. The interface may display a map or a menu or provide an overview of the locations of all the users in a defined group or of the location history of a particular user. The view may involve the use of tiled maps. The graphical user interface may present a stop report. A geofence may be created using a graphical user interface and an icon may be assigned to a geofence. A graphical user interface may also display an address book or be used to define alerts. Graphical user interfaces may also be used to present of points of interest on a portable electronic facility. A graphical user interface that may allow a user to vary the frequency with which a portable electronic device obtains location information.

BRIEF DESCRIPTION OF THE FIGURES

FIG. 31 presents a stop report.

Figure 33:
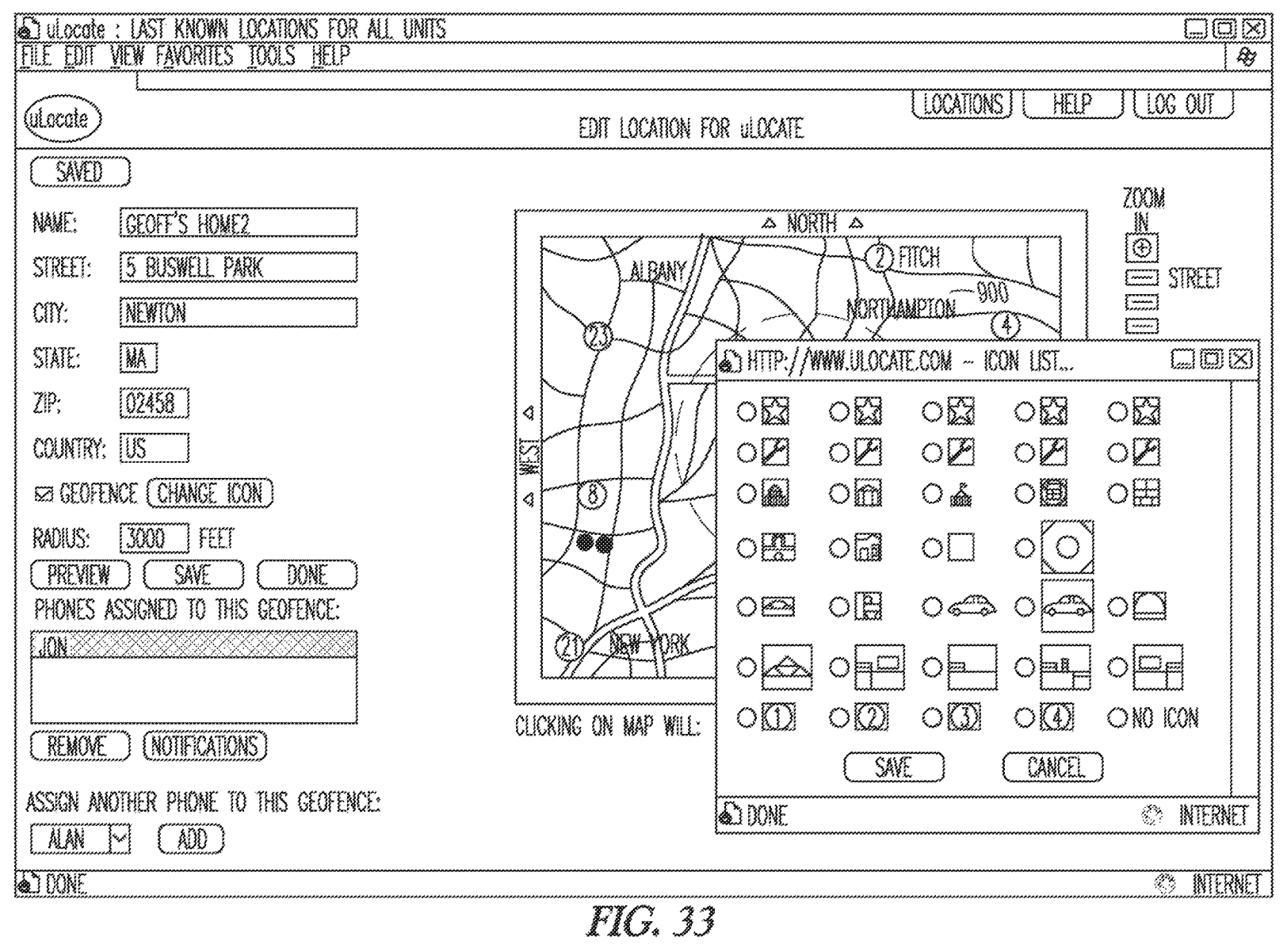

FIG. 33 shows several icons that may be assigned to a geofence.

FIG. 34 depicts an address book.

FIG. 36 depicts a graphical user interface that may be used to define alerts using the system.

DETAILED DESCRIPTION

Figure 1:
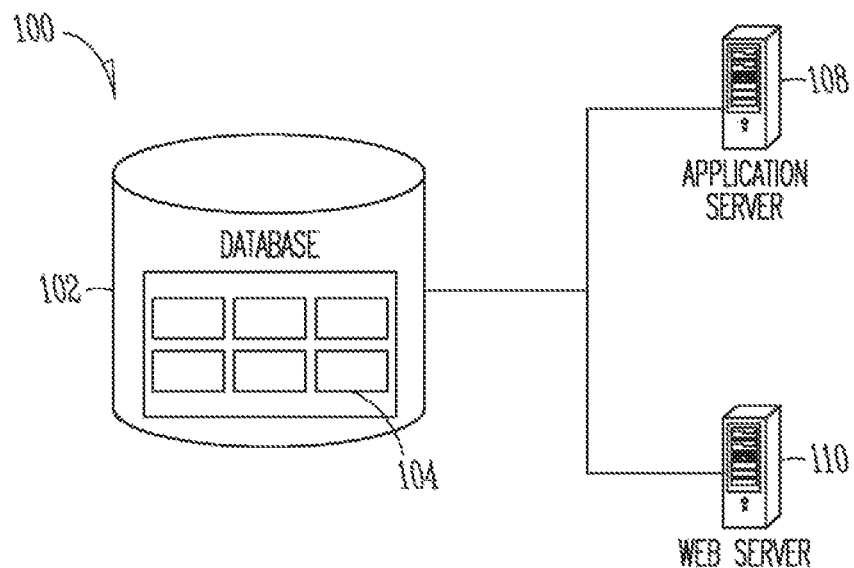
FIG. 1 is a block diagram of components of a location services facility.
Figure 3:
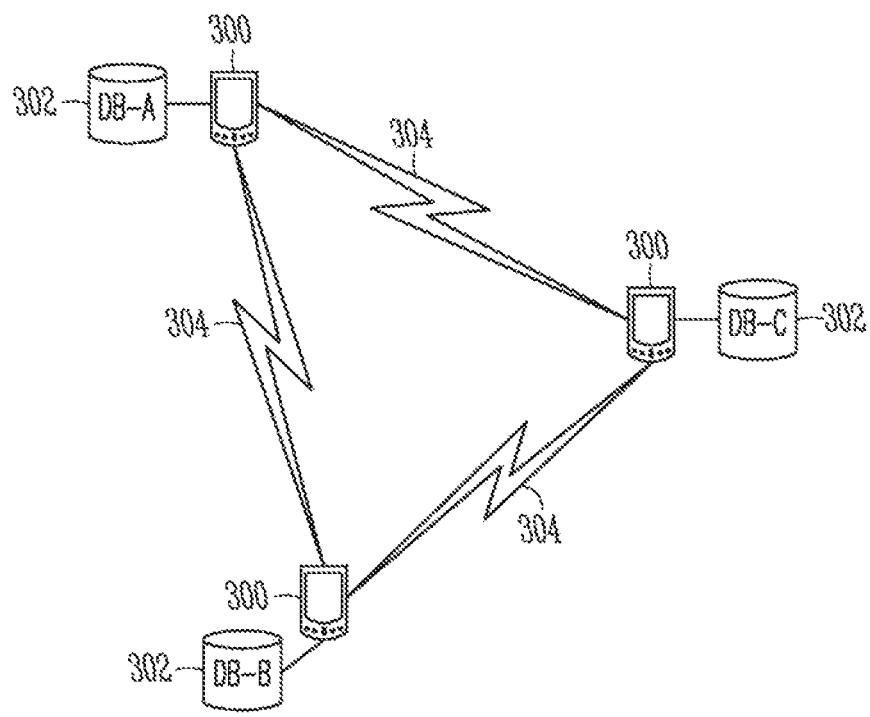
FIG. 3 is a block diagram of an aspect of a peer-to-peer configuration of the location services facility.
Figure 8:
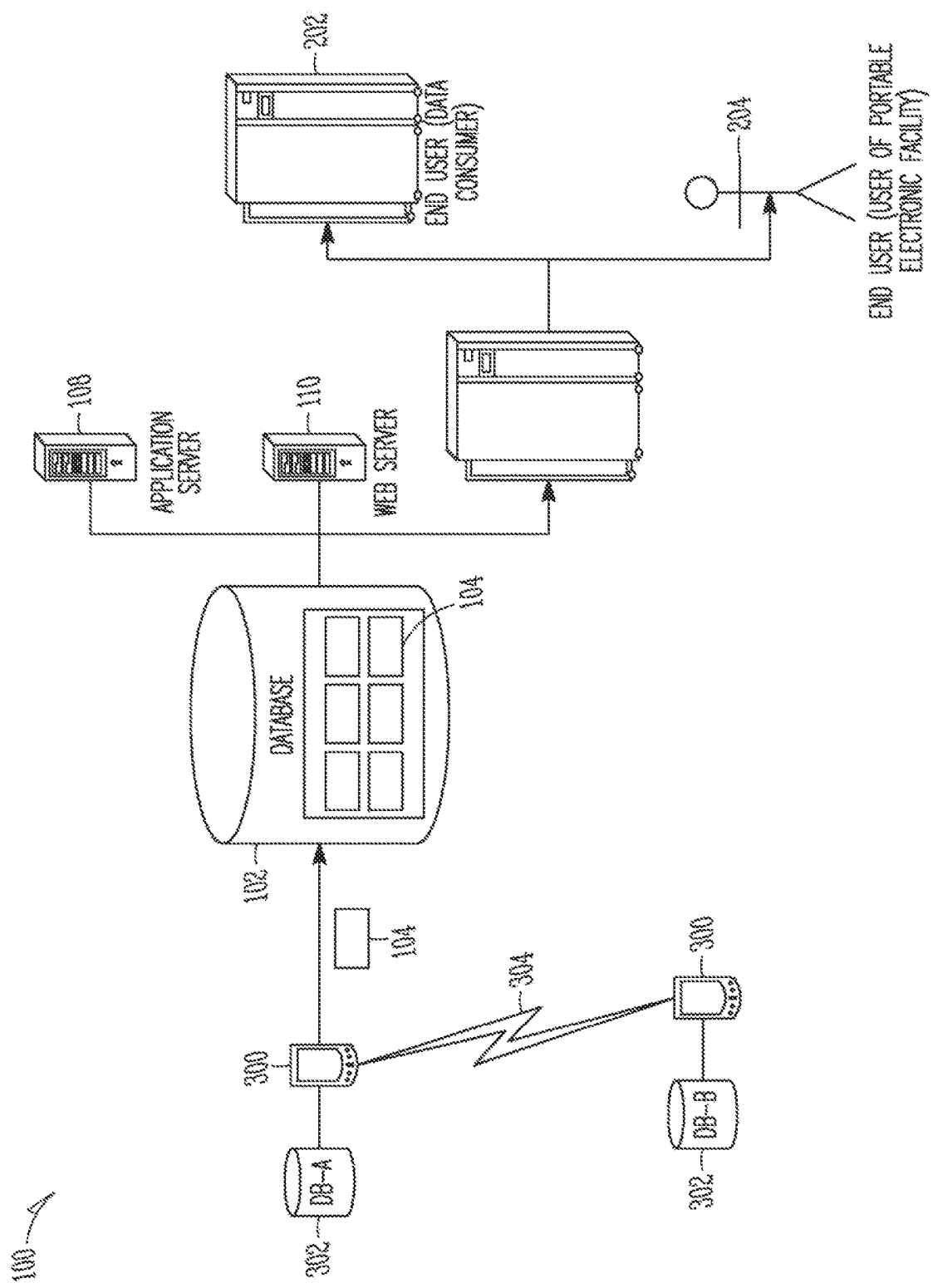
FIG. 8 is a block diagram of the major components of the location services facility of the present invention.

Referring to FIG. 1 and FIG. 8, the present invention comprises a location services facility that may provide services or data products associated with a geolocation datum 104 associated with a portable electronic facility 300. The location services facility may comprise a database 100 containing aggregate data 102, an application server 108, and a Web server 110. The location services facility may provide the aggregate data 102, in raw or processed forms, to a third-party service provider 200. In some embodiments, the present invention may comprise a network 304, which in some embodiments may be a peer-to-peer (P2P) network, comprising a plurality of facilities wherein each of the plurality of facilities may be a portable electronic facility 300 across which may be distributed the database 100, or its equivalent or constituent components 302, containing, in whole or in part, the aggregate data 102. An expanded view of one aspect of the P2P network is shown in FIG. 3. These embodiments are discussed in detail below and other embodiments will be apparent from the following discussion.

Figure 4:
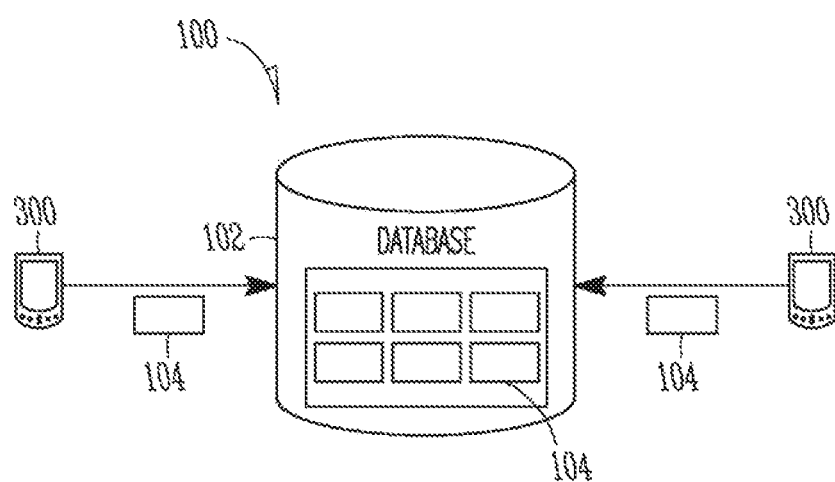
FIG. 4 is a block diagram of one aspect of the location services facility in operation.

Referring to FIG. 4, the disclosed invention may gather a datum 104 from a portable electronic facility 300. The datum 104 may be stored in the database 100. In particular, the datum 104 may be representative of a position and/or velocity associated with the portable electronic facility 300. Alternatively or additionally, the datum may be representative of an output value from a sensor associated with the portable electronic facility 300. In most cases, an additional datum 104 from the portable electronic facility 300 or another portable electronic facility 300 may also be stored in the database. The aggregate of a plurality of datum 104 from one or more portable electronic facilities 300 may comprise aggregate data 102, which may be stored within the database 100.

Referring again to FIG. 1, the aggregate data 102 may flow from the database 100 to the application server 108. The application server 108, in turn, may provide an application based service, a number of which are described below and the general provision of which further comprise the disclosed invention. The application based service may be provided to a user of the portable electronic facility via a Web interface such as a Web browser. In this case, embodiments may comprise the Web server 110 for delivering the service.

Figure 2:
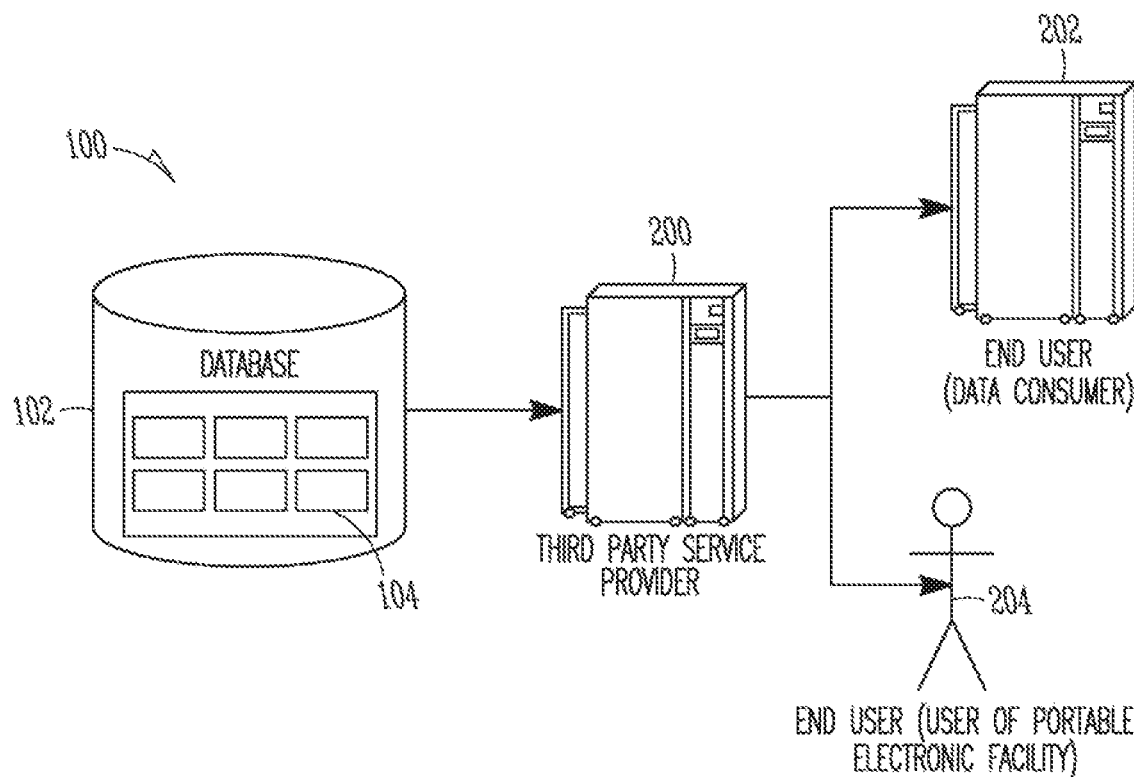
FIG. 2 is a block diagram of additional components of the location services facility.

Referring to FIG. 2, the aggregate data 102, in whole or in part, may be provided to a third-party service provider 200 in a predetermined format, which may be specified by an XML schema. As provided, the data may be formatted or modified according to various needs, including without limitation a need of a first end user 202 who may be a data consumer (such as, revealing consumer behavior); a need of a second end user 204 who may be a user of the portable electronic facility (such as, obeying a privacy agreement associated with the data); and/or a need of the third-party service provider 200 (such as, receiving data in a file that is formatted to facilitate automated processing). When formatted, the data may comprise a report, which may be a computer generated report.

The third-party service provider 200 may in turn provide a service to the first end user 202 or the second end user 204, wherein the service may be associated with the data. In some cases, the first end user 202 may be a marketing organization. Other cases will be apparent due to the following description.

In one embodiment, the aggregate data 102 may be disaggregated and provided to the third-party service provider as a single data point. This may be useful in many applications including, but not limited to, a service that provides to the end user a map showing the location of the user and the user's immediate surroundings; a service that provides to the end user a map showing the location of a point of interest in the vicinity of the user; a service that provides to the end user a map showing the location of another user; a service that provides to the end user a map showing the location of a pet associated with the user, wherein the pet may be fitted with a collar containing a portable electronic facility; the establishment of a geofence (described below in detail) and the monitoring of the portable electronic facility with respect to its crossing the geofence; and so forth.

In another embodiment, the aggregate data 102 may be scrubbed and provided to the third-party service provider 200 as a generalized dataset. This may be useful in many applications including, but not limited to, a service that may provide to a marketing company demographic information that may be representative of the generalized dataset, which may be representative of a plurality of users in a given geographical area; a service that may provide the user with highway traffic information that may be based upon aggregate traffic flows, which may comprise the generalized dataset; and so forth. For example and without limitation, in one application, the generalized dataset, which may comprise demographic information, may be representative of users' gender and spending habits, wherein the spending habits comprise the means and routes utilized by the users to arrive at a shopping destination. The generalized dataset may further comprise a unique identifier associated with each user represented, wherein the unique identifier may obscure the identity of each user while also allowing the third-party service provider 200 to discriminate between users, especially during an analysis of the generalized dataset.

In yet another embodiment, the aggregate data 102 may be provided in its entirety to the third-party service provider 200 as a comprehensive dataset. This may by useful in many applications including, but not limited to, a service that may provide to a logistics company detailed tracking information pertaining to a fleet of delivery vehicles, wherein each vehicle is located and tracked through time; a service that shows to a head of a household a plurality of locations representative of each of the members of the household; and so forth. For example and without limitation, a company providing cleaning services may utilize the aggregate data 102 to track how long its employees dwell at each customer location and which routes the employees take to travel to each customer location. This information may be useful in monitoring the efficiency of its employees and in optimizing assignments given to employees, for example and without limitation, by grouping jobs given to a particular employee into a smaller geographical area.

In still yet another embodiment, the aggregate data 102 may be processed to provide a service to a plurality of users. One example is a social networking application. For example, without limitation, a dating service may allow the plurality of users to enter individual preference information associated with a desired characteristic of a mate. Processing of the aggregate data 102 may allow the service to recognize when pairs of mutually desirable mates are in close proximity of each other. Data associated with this recognition may be transmitted to one or both users in the pair, allowing the users in the pair to meet each other. This transmission of data may be in the form of an alert, such as a text message, e-mail, automated telephone call, and so forth. For another example, an interested-based social network application may allow the plurality of users to enter individual preference information associated with a favorite pastime, such wine tasting. Processing of the aggregate data 102 may allow the service to recognize when events associated with the favorite pastime are being held in proximity to the users. Relevant users may be notified and additional information, which may encourage social interaction between the users, may be provided to users on the basis of the contents of the aggregate data 102. For example, a subset of users may, based upon observed travel patterns in the aggregate data 102, be likely carpool candidates to a local wine tasting event.

Generally, in embodiments, the aggregate data 102 may be disaggregated, scrubbed, reformatted, transmitted as-is, stored, processed, and/or formatted in any practicable manner that is useful to any particular third-party application. Moreover, in embodiments, an alert may be transmitted to a user, wherein the alert comprises data that is associated with a recognition that is associated with some form or component of the aggregate data.

Figure 5:
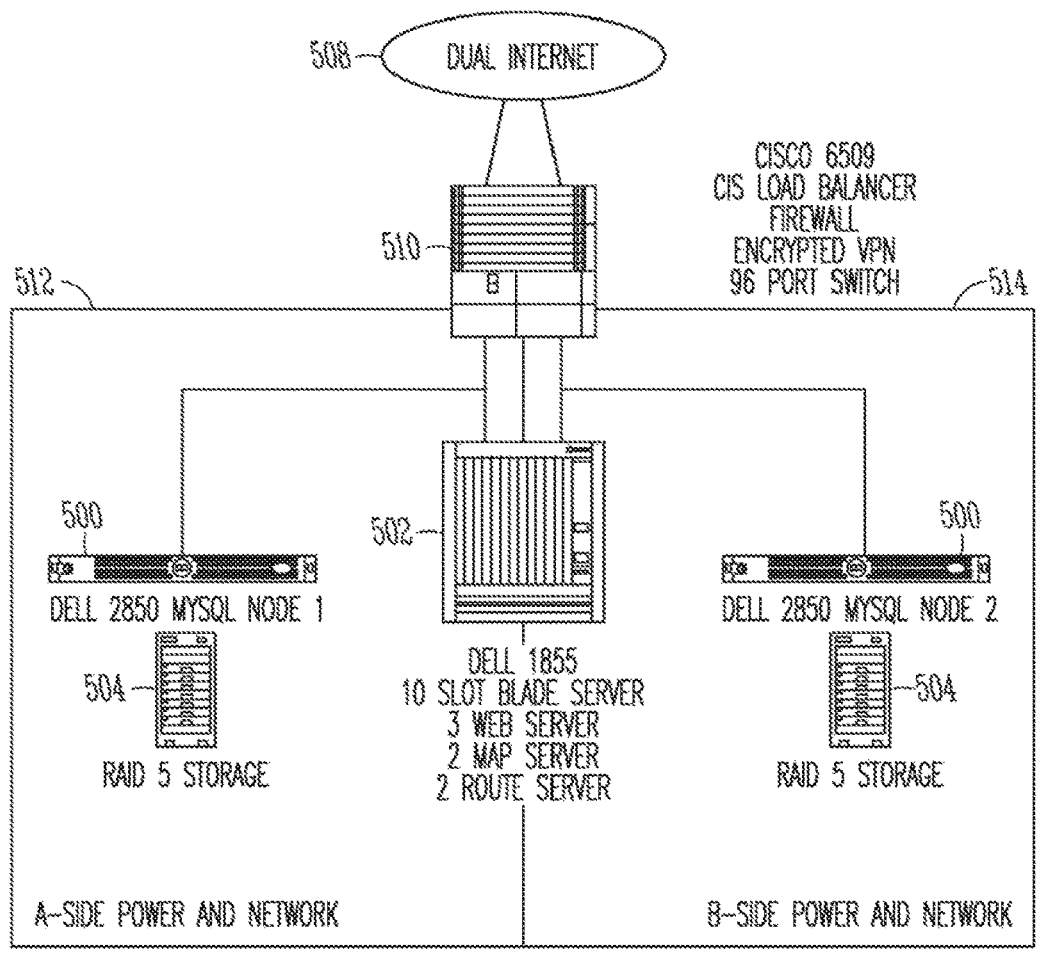
FIG. 5 is a schematic diagram of an embodiment of part of the location services facility.

Referring now to FIG. 5, in one aspect, a system according to the present invention may comprise a database server 500, which may comprise the database 100; a Web/Application server 502, which may comprise the application server 108 and the Web server 110; and a storage device 504, which may store the database 100. It should be clear to one of ordinary skill in the art that these servers may exist as one computer, as independent computers, as a network of workstations, as a cluster computer, as a part of a three-tier configuration such as a Web client connected via the Internet to a plurality of Web servers and application servers connected to one or more database servers, and so forth.

In one embodiment, a dual Internet connection 508 may arrive at a Cisco 6509 CIS load balancer/firewall/switch 510. Additionally connected to the Cisco 6509 510 may be an a-side 512 and a b-side 514 network, which may have independent main power sources. A Dell 1855 10-blade server 502 may bridge the two networks and may run a Web server and two application servers, namely a mapping server and a routing server. There may be, in each of the a-side 512 and b-side 514 networks, a Dell 2850 database server 500 which may be connected to a RAID 5 storage facility 504.

The database server 500, as is mentioned above, may store data representative of positions and/or velocities, which may be the aggregate data 102 and which may be associated with a plurality of portable electronic facilities 300.

The database server 500 may also store information pertaining to the user's privacy or security. The user may be provided an option to choose if the location and/or velocity of the portable electronic facility associated with the user is recorded in the database 100. This enables privacy by allowing the user to determine the persistence of data associated with the user. The user may also be asked to provide a personal identification number (PIN), which may be entered into a handset that may be the portable electronic facility 300. This PIN, perhaps in conjunction with the handset's phone number, comprises an authentication code needed to access a service enabled by the present invention, for example and without limitation, a Web site that provides a map showing the location of the user.

The database server 500 may also store information pertaining to the user's level of access to a service enabled by the present invention. This access level may be used to determine a user's privileges. In one instance, a parent may want to allow a child to have access to the location of other family members, but not allow the child to establish a geofence (described below) or an alert. In another instance, a plurality of handsets may be configured as peers in the network 304 when the network 304 is embodied as a P2P network. In this embodiment of the network 304, a first peer may exchange location and/or velocity data with a second peer provided that the second peer has an appropriate level of access to such information from the first peer. In yet another instance, the exchange of information from the first peer to the second peer may be conditioned on the second peer having both the appropriate level of access and the user of the second peer providing a PIN and/or authentication code that corresponds to a code stored in the database 100.

In other embodiments, some or all of the information pertaining to the user's level of access to a service is stored in the distributed database component 302 associated with the portable electronic facility 300.

Referring again to FIG. 1, the application server 100 may host a geospatial application. The geospatial application may provide geo-coding, mapping, or routing functionality. Mapping functionality may comprise overlaying onto a map a current location and a plurality of stored, past locations of the portable electronic facility. Routing functionality may comprise overlaying onto the map the current location of the portable electronic facility 300 along with a calculated path from the current location to a specified destination. The calculated path may be a straight line, a route that follows geographic features such as a road or a river, a path between navigational aids such as very high frequency omnidirectional range (commonly known as a VOR), a great circle path, and so forth. Both the routing and mapping functionality may be provided by a commercial, off-the-shelf (COTS) application, such as the MapQuest Enterprise Server.

The application server 100 may host an alert application. The alert application may transmit the alert to a user in response to the occurrence of an event designated by the user as an alert-generating event. The alert may be sent via e-mail, short message service (SMS), interactive voice response (IVR), voice, instant message (IM), or any other practicable method.

The application server 100 may host a geofencing application, which monitors the location of one or more portable electronic facilities with respect to a geofence.

The Web server 110 may provide a front-end interface to the user. The pages served by the Web server 110 may include geo-coding, mapping, routing, geofencing, or any other functionality supported by the application server 108 or the database 100.

The portable electronic facility 300 may take a number of portable forms, including but not limited to a cell phone; a PDA; an electronic watch; a handheld GPS; a laptop computer; a portable music player such as an Apple iPod; an electronic keychain; a camera; or any other portable electronic facility.

Figure 6:
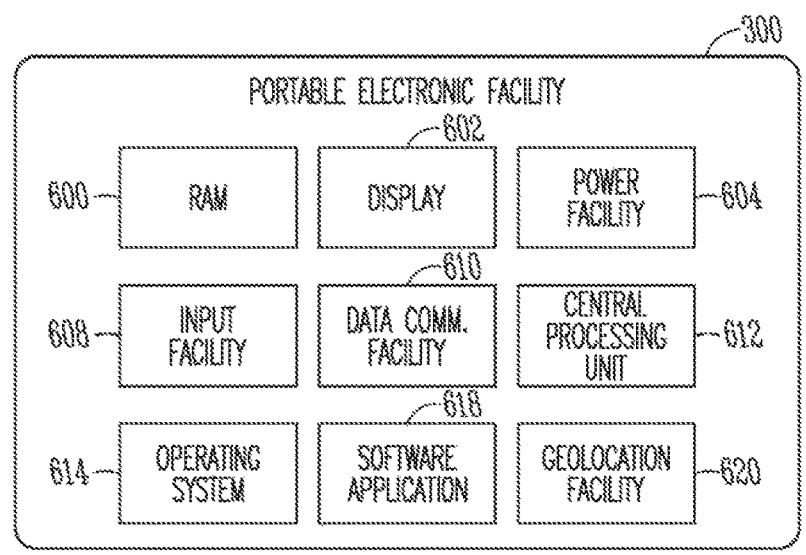
FIG. 6 is a block diagram of a portable electronic facility.

Referring now to FIG. 6, in addition to including technology providing for the ascertainment of the location of itself, the portable electronic facility 300 may comprise additional capabilities and facilities, such as a random access memory facility 600; a display facility 602, which may comprise a color display, a backlight, a liquid crystal display (LCD), a light-emitting diode (LED) screen, an organic light-emitting diode (OLED) screen, a flexible organic light-emitting diode (FOLED) screen, or a projection display; a power facility 604, which may comprise a battery, a power port, a photovoltaic facility such as a solar cell, or a fuel cell; an input facility 608, which may comprise a touch pad, a key pad, a stylus-based input facility, a speakerphone, or a microphone; a data communication facility 610, which may comprise a telescoping antenna, a fixed external antenna, an internal antenna, a serial data port, a parallel data port, a WiFi facility, a Bluetooth facility, or a ZigBee facility; a central processing unit 612; an operating system 614; a software application 618 such as but not limited to a game, a relationship management application, an expense tracker, a to-do list, a calendar, a notepad, a Web browser, an e-mail client, an audio file player, a photo viewer, a video viewer, a text editor, a time tracker, a day planner, a clock, a calculator, a dictionary, a file viewer, a synchronization manager, a virtual private network (VPN) client; and so forth.

The portable electronic facility 300 may provide functionality complementary to and, in some embodiments, enhancing the location based service. Such functionality may include Web browsing, Web searching, wireless communication, software application execution, software application interpretation, entertaining lighting effects, a moving map display, a static map display, a map display with zoom capability, a color map, a grayscale map, a black-and-white map, and so on.

In various embodiments, the portable electronic facility 300 could be used in a vehicle, while camping, during the exploration of terrain, mounted on an animal such as but not limited to a dog collar, during a game, while walking through a city, and so forth.

The portable electronic facility 300 may communicate with the other elements of the location services facility, for example and without limitation the application server 108, the Web server 110, the database 100, the third-party service provider 200, the first end user 202, the second end user 204, another portable electronic facility 300, the distributed database component 302, the peer-to-peer network 304, the database server 500, the Web/application server 502, the storage device 504, the dual internet connection 508, the Cisco 6509 510, the A-side network 512, and/or the B-side network 514. This communication may comprise two-way communication or one-way communication. In embodiments, the portable electronic facility 300 may comprise a radio frequency (RF) transmitter/receiver providing the capability of sending and/or receiving data from a cellular telephone network. The portable electronic facility may also or alternatively comprise an RF transmitter/receiver for sending and/or receiving data from a local area network, such as and without limitation an 802.11 b "WiFi" network. The data communication facility 610 may further comprise a physical connector, such as a docking port, which may allow for the synchronization of data to and/or from the portable electronic facility 300 and a host computer, such as a personal computer.

One consideration in the design of the portable electronic facility 300 may be battery life. There are a number of factors that may affect battery life. One factor may be the power density of the battery. Another factor may be the volume of the battery. Yet another factor may be the power consumption of the portable electronic facility 300 connected to the battery. In the portable electronic facility 300, it is typical for the power consumption to be dominated by RF transmission electronics that may be integral to the facility 300 and of which the data communication facility 610 may be comprised. This is due to theoretical and practical limitations of the physics of RF transmission. The battery life of the portable electronic facility 300, then, may be improved by limiting the amount of time that the portable electronic facility 300 is transmitting data: the transmission electronics may be powered down the rest of the time. Likewise, it is known that the power consumption of RF receive electronics, of which the data communication facility 610 may also be comprised, may have a considerable impact on the battery life of the portable electronic facility 300. It follows that methods for limiting the amount of time that the portable electronic facility 300 is sending and/or receiving data may be present in some embodiments of the location services facility. These methods may comprise varying the length and/or frequency of transmissions to and/or from the portable electronic facility 300.

Another consideration in the design of the portable electronic facility 300 may be a speed with which the facility provides the user with data and/or the accuracy of the data. In embodiments, the portable electronic facility 300 and/or the location services facility at large may be designed to vary the length and/or frequency of data transmissions to and/or from the electronic facility 300 to improve the speed with which the facility 300 provides a user with data and/or the accuracy of the data.

One aspect of the location services facility is to provide location information to the user. Location information may comprise latitude; longitude; altitude; depth; pitch; roll; yaw; time; velocity; or orientation and/or distance to or from a waypoint, an origin, a destination, magnetic north, or true north. The location may be presented to a user in a number of embodiments including, without limitation, a map, a moving map, an interactive map, a textual description, a spoken description, a color code, an aural code, an e-mail, a text message, a pager message, a printout, and so forth.

The location information provided by the location services facility to the user may originate from the use of various methods incorporating data from a sensor facility such as, without limitation, a global positioning system (GPS), a radio frequency identification (RFID), a plurality of cell phone towers (for example, for time and/or triangulation), an altimeter, a depth gauge, a gyroscope (including "gyroscopes" that use a vibrating structure, a laser, or a MEMS device), an inertial sensor, a compass, an accelerometer, a speedometer, a seismometer, a magnetometer, a thermometer, a photon detector (including, but not limited to, a visible camera, an infrared (IR) detector, an ultraviolet (UV) detector, an X-ray detector, a gamma-ray detector, a Geiger counter), a hygrometer, a heart rate monitor, a blood glucose meter, a blood oxygen meter, an electrical sensor, an electrical interference sensor, a current sensor, a resistance sensor, a thermistor, an electrostatic sensor, a frequency sensor, a temperature sensor, a heat sensor, a thermostat, a differential light sensor, an opacity sensor, a scattering sensor, a diffraction sensor, a refraction sensor, a reflection sensor, a polarization sensor, a phase sensor, a florescence sensor, a phosphorescence sensor, an optical activity sensor, an optical sensory array, an imaging sensor, a calibrated micro mirror array, a calibrated pixel array, a micro mirror array, a pixel array, an angular momentum sensor, a rotation sensor, a rotation speed sensor, a rotation direction sensor, a velocity sensor, an inclinometer, a momentum sensor, a smoke detector, a fire sensor, a heat detector, a combined heat and smoke detector, a vapor sensor, a gas sensor, a signal sensor, a wireless signal sensor, a cellular signal sensor, a Wi-Fi signal sensor, an Internet signal sensor, a touch sensor, a contact sensor, a viscosity sensor, a position sensor, a height sensor, a ray detector, a microwave sensor, a proximity sensor, a distance sensor, a motion sensor, a range sensor, a mote, a marker, a powered marked, a signal emitter, a signal receiver, a powered signal emitter, a powered signal receiver, a chemical sensor, a fire sensor, a hazardous material sensor, a hazardous vapor sensor, a biohazard sensor, a bacteria sensor, a virus sensor, an anthrax detector, a nerve gas sensor, a poisonous gas sensor, a carbon monoxide detector, an energy sensor, or an aerosol sensor. RFID tracking may, without limitation, comprise a portable electronic facility further comprising a RFID transponder that is interrogated by electronic equipment that is installed along a roadway, along a sidewalk, at the entrance of a building, at the egress of a building, or in a building.

Once created, the location information may be compiled, accessed, processed, searched, sorted, or in any other way manipulated for the benefit of the first end user 202, the second end user 204, or any other entity that values the user's location information. In embodiments a location may be obtained from a database, such as based on the location of a wireless access facility, such as a Wi-Fi or 802.xx access point, switch, or similar device.

In embodiments, an individual location information sample, which may be a datum 104, may be subject to errors, which may be due to physical or practical limitations of the location services facility. For example, cell phone triangulation systems are limited by RF multipath effects due to large metal structures such as building or water towers. One method of compensating for these errors may comprise processing multiple location samples to determine, via statistics or heuristics, to what extent the individual location information sample may be reliable. Another method of compensating for these errors may comprise processing multiple location samples to determine an aggregate location information sample that may include information such as mean location and standard deviation, which may provide a more accurate determination of location than the individual location information sample.

Figure 7:
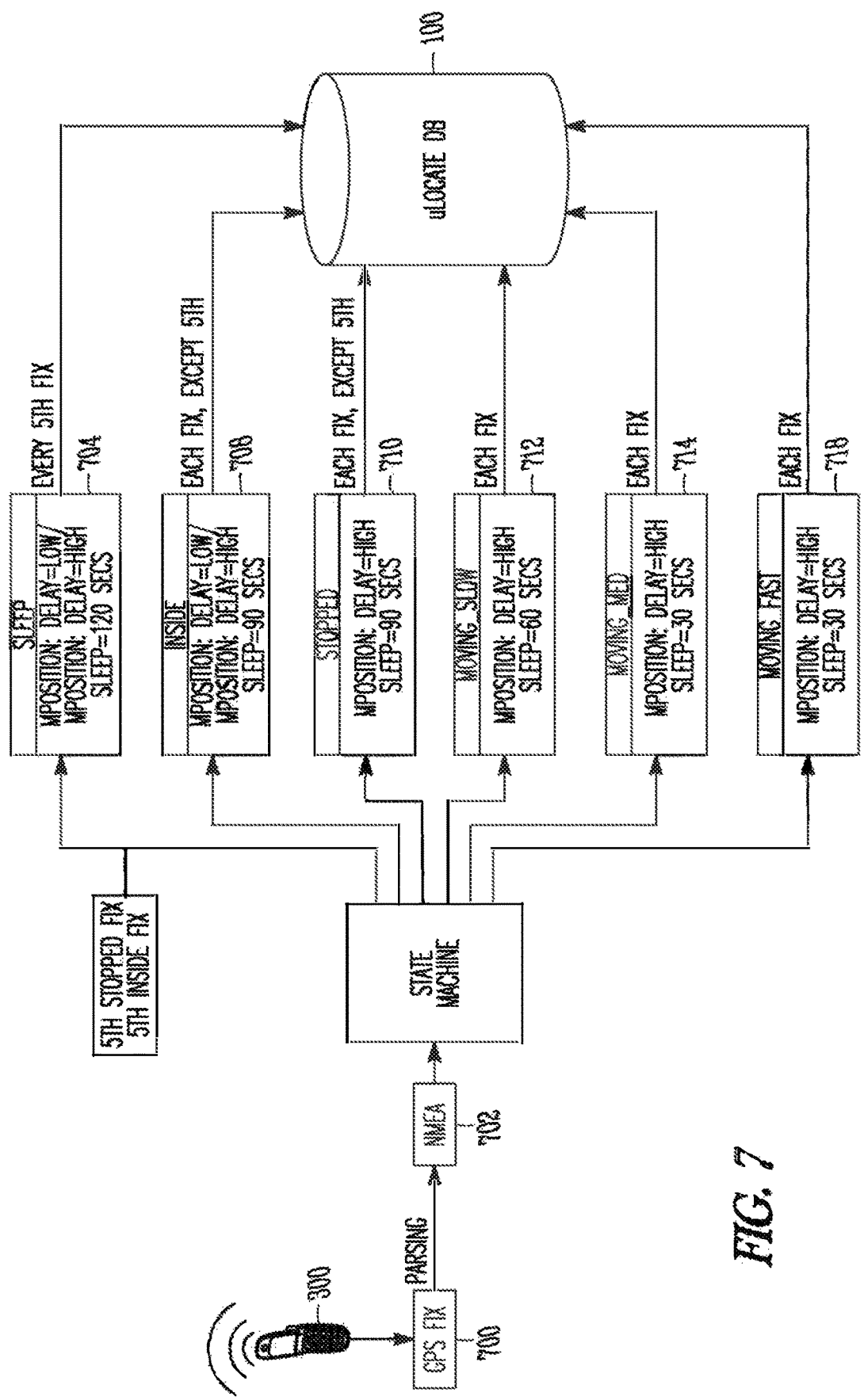
FIG. 7 is a block diagram of a GPS state machine.

Referring now to FIG. 7, the portable electronic facility 300 may comprise a state machine 702 heuristic approach to obtaining a GPS fix 700. The state machine 702 may comprise a plurality of states, 704, 708, 710, 712, 714, and 718. The state machine 702 may comprise a fix delay, which may be a string that may be processed by the central processing unit 612, the operating system 614, the software application 618, the geolocation facility 620, or any other facility associated with the geolocation facility 620. In the plurality of states, "mposition:delay=low" may indicate a fix delay that may take no greater than 32 seconds to provide a limited degree of computation for determining a low-accuracy velocity of the portable electronic facility 300. "mposition:delay=high" may indicate a fix delay that will take no greater than 3 minutes and 32 seconds to provide a substantial degree of computation for determining a high-accuracy velocity of the portable electronic facility 300.

The Inside State 704 may reflect that the facility 300 may be receiving the GPS fix 700 from a tower. In this state, the facility 300 may sleep for 90 seconds and then may attempt to receive a fix, at first, using mposition:delay=low and then for every fix thereafter using mposition:delay=high. Should the facility 300 receive five fix attempts in the Inside State 704, the facility 300 may go into the Sleep State 704.

The Stopped State 710 may reflect that the facility 300 may be receiving the GPS fix 700 from a satellite and that the facility 300 may be associated with a speed, according to the fix's National Marine Electronics Association's (NMEA) string 720, of approximately 0 kilometers per hour (KPH). In this state, the facility 300 may sleep for approximately 90 seconds and then may attempt to receive a fix using mposition:delay=high. Should the facility 300 receive five sequential GPS fixes 700 in the Stopped State 710, the device may go into the Sleep State 704. In the Stopped State 710, the facility 300 may send every GPS fix 700, of which a datum 104 may be comprised, to a datum receiving facility, which may, without limitation, comprise the database 100, the application server 108, the Web server 110, another portable electronic facility 300 such as via the P2P network 304, or any other facility associated with the database 100 or the distributed database component 302.

The Moving Slow State 712 may reflect that the facility 300 may be receiving the GPS fix 700 from a satellite and may be associated with a speed, according to the fix's NMEA string 720, of greater than approximately 0 KPH and less than approximately 17 KPH. In this state, the facility 300 may sleep for 60 seconds and then may attempt to receive the GPS fix 700 using a mposition:delay=high and every GPS fix may be sent to the datum receiving facility.

The Moving Med State 714 may reflect—that the facility 300 may be receiving the GPS fix 700 from a satellite and may be associated with a speed, according to the fix's NMEA string 720, of greater than approximately 17 KPH and less than approximately 106 KPH. In this state, the facility 300 may sleep for 30 seconds and then may attempt to receive the GPS fix 700 using mposition:delay=high and every GPS fix 700 may be sent to the datum receiving facility.

The Moving Fast state 718 may reflect that the facility 300 may be receiving the GPS fix 700 from a satellite and may be associated with a speed, according to the fix's NMEA string 720, of greater than approximately 105 KPH. In this state, the facility 300 may sleep for 10 seconds and then may attempt to receive a GPS fix 700 using mposition:delay=high and every GPS fix may be sent to the datum receiving facility.

The Sleep State 704, as is mentioned above, may reflect that the facility 300 may have received five GPS fixes in a row in the Stopped State 710 or may have receive five GPS fixes in a row in the Inside State 708. In this state, the device may sleep for approximately two minutes and then attempt to receive a GPS fix 700 alternating with the use of mposition:delay=high and mposition:delay=low.

The state machine may also note a significant position change wherein a new GPS fix may generate a measured change in distance of greater than 10 kilometers. A check for the significant position change may be taken on every GPS fix 700 in the Sleep State 704 or Inside State 708.

When the portable electronic facility 300 is switched into an operational mode, the facility 300 may make an attempt to retrieve a GPS fix using an mposition:delay=low. If the facility 300 cannot receive a satellite GPS fix 700 on a first fix attempt, the facility 300 may immediately or soon thereafter make another attempt to receive a GPS fix 700 using mposition:delay=high. In either case, the facility 300 may consequently be considered to be initialized.

The facility 300 may, based upon its current state, make attempts to receive the GPS fix 700 at a rate, which may be periodic. In the event that the GPS fix 700 cannot be obtained or is invalid, the facility 300 may alert a user of the facility 300. In the event that a valid GPS fix 700 cannot be obtained during five consecutive attempts, the facility 300 may discontinue attempts to get the GPS fix 700, which may necessitate a manual restart of the facility 300 to renew attempts to obtain the GPS fix 700.

Once obtained or calculated, the location information, which may comprise the GPS fix 700, may be used in an application service including, but not limited to, an entertainment application service such as location-aware games, a commerce application service such as location-based transactions, an information application service such as mapping a route from an origin to a destination, or any other application service specified, mentioned, implied, or made apparent by this discussion.

Figure 9:
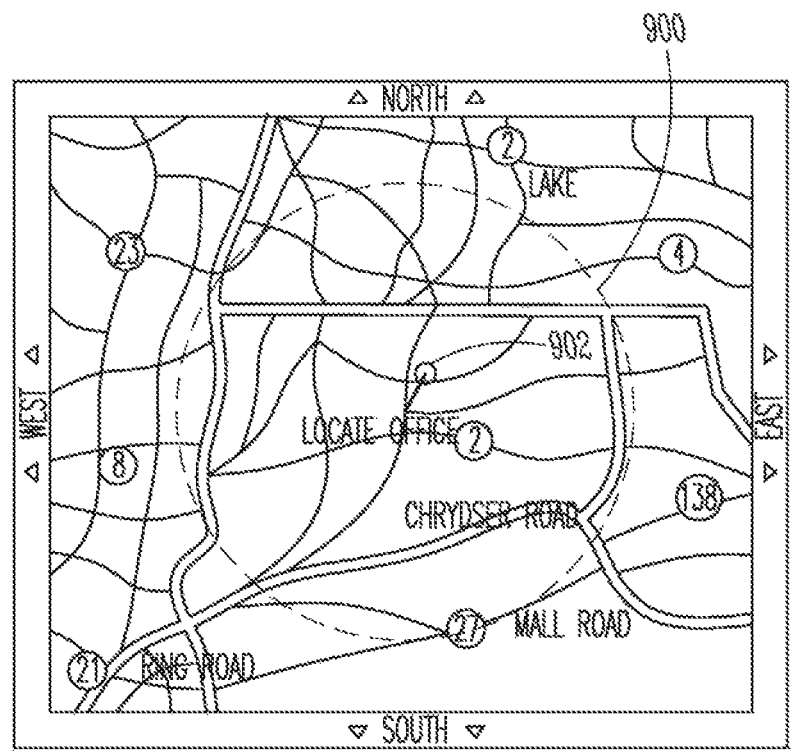
FIG. 9 is a map overlaid with a geofence and a geographic location.

Referring now to FIG. 9, as mentioned above, the location services facility may support a geofencing application that involves the geofence 900. In one case, the geofence 900 is the circumference of a circle that is defined by a user who specifies a geographic location 902 for its center and a radius. In general, the geofence 900 may be defined as any arbitrary boundary between one geographic area and another, wherein the boundary may be stationary or may move, wherein said movement either may be correlated to the movement of a physical object such as the portable electronic facility 300 or may be determined arbitrarily. In any case, the geofencing application may be the alert application and, therefore, may generate the alert when the portable electronic facility 300 crosses the geofence 900. This alert may be transmitted to the user who specified the crossing of the geofence 900 as an alert-generating event. Alternatively or additionally, this alert may be transmitted to a second user who either opted to receive the alert or who was designated to receive the alert. Optionally, the alert may pertain to a facility in the vicinity of the geofence 900, such as and without limitation an advertisement for a nearby restaurant.

In embodiments, the user may define and/or manipulate a geofence 900 via the Web browser of the three-tier architecture. Alternatively, the user may define and/or manipulate a geofence 900 via the portable electronic facility 300, for example and without limitation via the input facility 608 of the portable electronic facility 300.

The location services facility may support a number of end uses. One end use may comprise a location based adaptable user interface. For example, in an embodiment, the portable electronic facility 300 may be a cell phone. A screen integral to the cell phone may display information to the user of the cell phone. Under usual circumstances, the screen may display a small menu of options, such as show location and get directions. However, when the cell phone is within proximity of a restaurant, the screen may display an additional menu option make dinner reservation. This adaptation to the menu of options is an example of a location based adaptable user interface.

Another end use may comprise the tracking of the location of the portable electronic facility 300, which has been described above.

Yet another end use may comprise providing business information associated with the portable electronic facility. For example, a comprehensive stop report provided by the location services facility may comprise a plurality of entries comprising a stop identification, a time, a duration, and a location. The stop identification may comprise a unique identifier comprising a number associated with a stop made by a delivery truck. The time may be associated with a time at which the delivery truck stopped. The duration may be associated with the time that the delivery trucked dwelled at the stop. The location may be associated with the geographic location of the stop. In total, the comprehensive stop report may provide information useful to an operator of a business in monitoring the performance of a fleet of delivery trucks.

Still yet another end use may comprise remotely affecting the portable electronic facility 300. In one embodiment, the location services facility may start, stop, or change an application on the facility 300. The application may comprise, without limitation, a map, a route, a to-do list, a calendar, a calculator, an expense report, a mileage tracker, a phone book, and so forth.

Another end use may comprise outputting location information on the portable electronic facility 300. As is mentioned above, the portable electronic facility 300 may provide to the user location information associated with the portable electronic facility 300, for example and without limitation, information in the form of a map. The portable electronic facility 300 may augment the information provided by the location services facility with information from the sensor. For example, the location services facility may provide mapping information to the portable electronic facility 300 according to the location data provided by the facility 300 to the location services facility. Upon this map, the facility 300 may overlay an artificial horizon, which provides pitch and roll information to the user. This pitch and roll information may be provided to the portable electronic facility 300 by the sensor.

Yet another end use may comprise outputting location information on the portable electronic facility 300, wherein the location information itself depends upon the output sensor. For example, in an embodiment wherein the sensor is a visible camera, images of surrounding terrain may be captured by the camera and may be transmitted to the location services facility. The location services facility may analyze these images and transmit location information associated with the images back to the portable electronic facility 300. This location information may then be output by the portable electronic facility 300 for presentation to the user.

More generally, a plurality of end uses may comprise presenting location based information to the user in response to the characteristics of a location. In one embodiment, as described above, the characteristics of a location may be the terrain in the vicinity of the location. In other embodiments, the characteristics of a location may, without limitation, comprise the barometric pressure, humidity, temperature, radioactivity, depth, infrared lighting, visible lighting, ultraviolet lighting, and so forth.

Another end use may comprise providing location information associated with a transaction. In one embodiment, a person may present a credit card associated with the user to a merchant at a point of sale. The merchant or merchant's bank may query the location services facility to determine the location of the portable electronic facility 300 associated with the user. If the portable electronic facility 300 is located at the merchant then the user may be presumed to be located at the merchant and the person may be presumed to be the user. Therefore, the transaction may be authorized. Conversely, if the portable electronic facility 300 is located at a location other than at the merchant then the location of the user may be deemed to be in question and the person is may not be deemed to be the user. As a result, the transaction may be denied or the merchant may be required to further verify the identity of the user.

Yet another end use may comprise tailoring information to the behavior of a user. In one embodiment, the location services facility may recognize that the route a user usually takes to and from work is suboptimal. In response to this behavior of the user, the location services facility may provide to the user a custom tailored, daily-commute route map.

More generally speaking, end uses of the location services facility may provide information to the portable electronic facility 300 based on information received from the portable electronic facility 300, including but not limited to information associated with the user's behavior.

Figure 10:
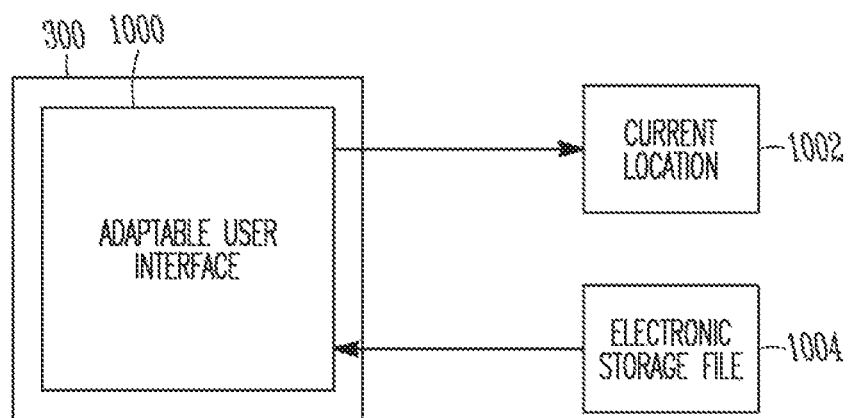
FIG. 10 is a block diagram of an adaptable user interface.

Referring now to FIG. 10, the present invention may provide an adaptable user interface 1000, which may transmit a current location 1002 of a portable electronic facility 300, such as to another device or system and may receive an electronic storage file 1004 or other indication of the current location of the portable electronic facility 300. The file or message may contain code the enables a specific user interface capability for the portable electronic facility 300, so that it displays a version of the user interface 1000 based on the contents of the electronic storage file 1004, message or other contents. The portable electronic facility 300 may take various forms, such as, without limitation, a mobile phone, a GPS enabled mobile phone, a CDMA enabled mobile phone, a GPRS enabled mobile phone, a mobile phone with a camera, a mobile phone with browser capabilities, a GPS unit, a tracking unit, a portable electronic device with a compass, a laptop computer, a personal digital assistant, an MP3 player, a camera, a handheld device, a pager, and/or a portable gaming device. The portable electronic facility 300 may be wearable.

The storage file 1004 may be transmitted from a remote location and may without limitation be in a format such as an XML document, a script, an HTML document, a program, a database, a table, a message, a folder, an application, an animation and/or a text file. The storage file 1004 may contain user interface information, such as specific menus that may be for a specific location and/or specific allocations that may be for a specific location. The storage file 1004 may be updatable, wherein the user may manually update the storage file 1004 with information or wherein the storage file 1004 may be automatically updated with information. The update may occur when a user stops at a location.

In embodiments, the storage file 1004 may be stored locally and/or remotely. The storage file 1004 may contain similar locations, such as without limitation points of interest, which may be displayed based upon factors such as speed, location, and/or user preference. The user preference may be maintained in a user-preference file, which may be stored locally and/or remotely, and which in certain embodiments may comprise the storage file 1004.

In embodiments one feature of the adaptable user interface 1000 is that the user may modify the interface 1000. For example, a menu selection may be modified, automatically and/or manually. Selections from the menu may be added, such as from a list of menu options. Another feature of the adaptable user interface 1000 is that an application selection may be modified, automatically and/or manually, wherein the modification may be the addition and/or removal of an application, which may be selected from an available list. Yet another feature of the adaptable user interface 1000 is that it may maintain location specific information, wherein the information may be available near the location, wherein user orders may be created. The user orders may be based without limitation on a user list; the proximity of a store; an order sent by text; an order sent by voice; or another order that may be transmitted. The locations in the storage file 1004 may be based on a coordinate system, such as and without limitation the Cartesian coordinate system; the polar coordinate system; latitude and longitude; and/or latitude, longitude and altitude.

The adaptable user interface 1000 may produce results, such as an answer to a user's query. The results may be based on the location of the portable electronic facility 300, wherein the results may be sorted based on the speed and/or direction, preferences, and/or accessibility of locations of the portable electronic facility 300. Web search results may be based upon the location of the portable electronic facility 300 and may be sorted based on portable electronic facility 300 speed, portable electronic facility 300 direction, preferences, and/or accessibility of locations. A localized search may be conducted based on the location of the portable electronic facility 300, wherein the search results may be sorted based on portable electronic facility 300 speed, portable electronic facility 300 direction, preferences, and/or accessibility of locations.

Figure 11:
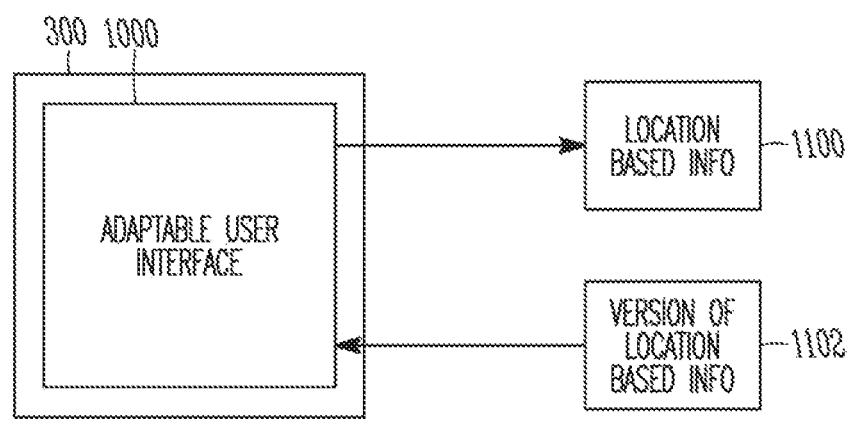
FIG. 11 is a block diagram of an adaptable user interface.

Referring now to FIG. 11, an adaptable user interface 1000 may provide for receiving location-based information 1100 associated with the portable electronic facility 300 and outputting a version 1102 of such information 1100 through the portable electronic facility 300. The information 1100 may be received in response to a transmission of the location of the portable electronic facility 300. The output version 1100 of such information 1102 may without limitation be visual, audio, a facsimile, an email, voice, a light, a change in the intensity of a light, a change in the color of a light, via SMS, via an instant message, via a text message, and/or an application that may only be available at certain locations. In some embodiments, at least one menu item may be changed in response to the information 1100. Moreover, the user may modify the interface 1000.

The information 1100 may be defined in relation to an object and/or a location. Multiple networks may supply the information 1100, which may be altered such as created, updated, supplemented, augmented, reduced, encoded, decoded, encrypted, decrypted, and/or deleted. Alterations may be at a frequency that may be based on the velocity of the portable electronic facility 300 and/or the location of the portable electronic facility 300. The information 1100 may be a geocentric list.

The information 1100 may be specific to a user and may without limitation alter the look and feel of the facility 300, alter the functionality of the facility 300, be in an XML format, be in a database format, and/or be in a text file format.

An alert, which may relate to an item on a list, may be triggered in response to the information 1100.

Figure 12:
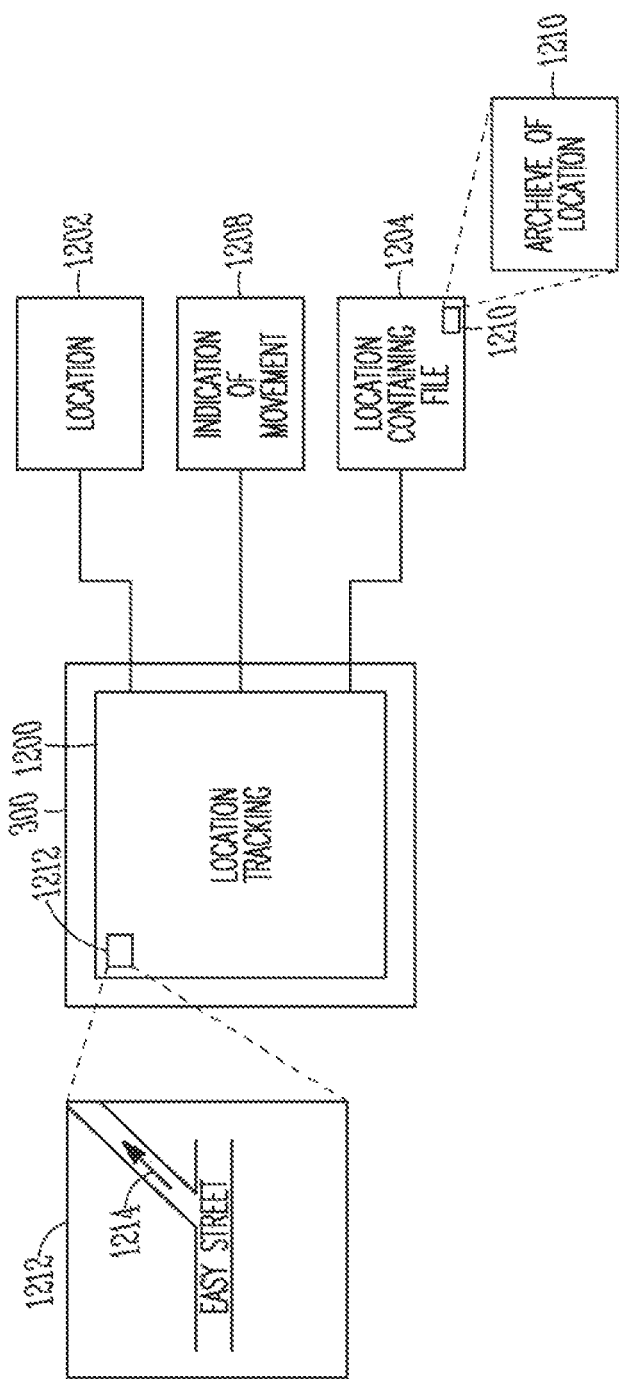
FIG. 12 is a schematic diagram of location tracking.

Referring now to FIG. 12, the present invention may provide for location tracking 1200, wherein a location 1202 of a portable electronic facility 300 may be transmitted, stored in a file 1204 (which, in embodiments, may comprise the electronic storage file 1004), stored with other information (such as and/or associated with aggregate data 102, datum 104, geographic location 902, and so forth) in the portable electronic facility 300, and reported along with an indication of the movement 1208 of the portable electronic facility 300. The file 1204 may be stored remotely (such as and without limitation in database 100, in a distributed database component 302, in a database server 500, and/or in a storage device 504). The file 1204 may maintain an archive 1210 of a plurality of locations 1202 associated with the portable electronic facility 300, which may be displayed and in which an indication of movement 1208 may be reported.

The information itself may be displayed on a map 1212 and may comprise an indication of speed and/or direction 1214. The location 1202 may be masked, wherein the masking may involve substituting a different location for the actual location 1202.

In applications, the location tracking facility 1200 may be used by families to track members of the family, such as children or elderly members of the family. For example, in tracking the location of a child, the tracking may identify a position, within a yard, upon the activation of certain triggers, such as upon request by another family member, if the child is lost, and/or only at specified times such as a day of the week and/or time of day. For example, in tracking the location of elderly, the tracking 1200 may be in a home, in a hospital, and/or in a care facility.

In other applications, the location tracking 1200 may be used to track driving and/or vehicle location. This tracking 1200 may comprise tracking location 1202, speed, and/or a set path. An alarm, which may be an alert, may be sent when the driving is classified as speeding. An alert may also be sent if the vehicle position is outside a boundary, wherein the boundary is associated with shipping a hazardous material.

In some applications, the location tracking may encompass the vehicle location of every vehicle in a fleet.

In general applications, the tracking 1200 may be remotely set, permanently enabled, and/or disabled only from a remote location. Thus, the portable electronic facility 300 may be controlled remotely, which may include the remote control of an application (such as and without limitation software application 618) within the portable electronic facility 300.

In yet another application, the tracking 1200 may be used for computer gaming, wherein one or more features of the game may be based on the real-world location 1202 of the portable electronic facility 300. In embodiments the real-world location 1202 of the portable electronic facility 300 may be used to trigger other actions or events within the game. In such embodiments, the real-world location may be fed to a program or system that generates game conditions based on the location, such as from a table, database, or other facility, or based on real-world information associated with the location, such as weather information, stored views of the location, maps of the location, or the like. For example, the current weather conditions in the environment surrounding the portable electronic facility 300 may be retrieved from a server that obtains weather information, and a game operating on the portable electronic facility 300 may present similar conditions to the user of the portable electronic facility 300, such as in a role-playing game, a driving game, first person shooting game, or other simulation game. Similarly, a map for area surrounding a user may be used to generate a simulated environment in the game that resembles the user's real world environment. For example, locations of buildings and roads can be used to create a "track" in a driving game, or to create obstacles or locations in a role-playing game. In embodiments locations of other portable electronic facilities 300, such as those used by friends or family members of a user, can be used to generate game elements, such as to allow users to "race", "battle", or otherwise interact in a multi-player game that draws elements such as weather, roads, or buildings from the real-world environments of the users of the portable electronic facilities 300. Thus, in a variety of embodiments, a game on a portable electronic facility 300 may be location-based.

In still another application, the location tracking 1200 may be used as a basis for selecting entertainment such as determining available shows, movies, and/or food facilities. For example, a menu of video or movie clips may be made available based on the location of the portable electronic facility 300, such as showing movies that contain scenes that depict areas that are in proximity to the current location of the facility 300, showing tourist information for the area near the facility 300, or the like.

In still yet another application, the tracking 1200 may be associated with a police activity, such as, without limitation, tracking shoplifters, tracking criminals, placing a portable electronic facility 300 in a money bag, and/or placing a portable electronic facility 300 in a bank teller drawer.

In another application, the tracking 1200 may be associated with a security activity, such as and without limitation tracking people within a facility, wherein the tracking may comprise tracking direction and/or speed; tracking personnel such as sales people, social workers, home health care workers; tracking dangerous substances; and/or tracking dangerous shipments. For example, a geofence may be established around a particular location, so that an alert is sent if a person exits the area of the geofence, such as if a home health care worker leaves a scene, a worker enters a hazardous area, a shipment departs from a planned route, a social worker fails to appear at a designated location for an appointment, a maintenance worker fails to appear at a designated location, or the like.

In still another application, the tracking 1200 may be associated with a pet, such as and without limitation tracking the pet within a yard and/or if lost. A geofence may be established around the pet, so that an alert is sent if the pet departs the region of the geofence.

In yet still another application, the tracking 1200 may be associated with a school, such as and without limitation tracking students and/or employees at all times and/or only if they leave school property. A geofence around the school can allow a teacher, administrator or parent know when a child arrives at the school, leaves the school, or the like. Thus, portable electronic facilities 300 can be used to check attendance against the rolls of the school, and to determine the locations of absent students who possess such portable electronic facilities 300.

In an embodiment, the tracking 1200 may be associated with health care, such as and without limitation tracking patients, doctors, and/or nurses. In this application, the tracking 1200 may be within a health care facility, outside a health care facility, and/or may comprise finding the closest doctor and/or nurse in an emergency. A geofence may be established, for example, indicating when a patient has left a hospital, or indicating when a doctor arrives or departs the proximity of the facility, such as to generate an alert if there are not enough staff available to handle an emergency.

In another application, the tracking 1200 may be associated with real estate, such as, without limitation, tracking a location of a house for sale, which may be associated with a picture, directions, and/or tracking visitors to the real estate. For example, a portable electronic facility 300 may be associated with a digital camera, and the location of a picture or recording, as determined by the tracking facility 1200, may be embedded in the picture or recording for future retrieval of the location of the picture. Such a picture or recording location capability may be used to know the location of a real estate location, the location of an accident, the location where a photo was taken during a vacation, the location of a crime, or the location of another event that is recorded on the digital camera.

The capability to record the location of a picture or a recording may support transport logistics, the adjustment of traffic signals, the documentation of potholes, the documentation of defects in infrastructure, and/or an insurance purpose. The insurance purpose may comprise documenting the location of accident; capturing a picture or recording of an accident such as for the purpose of adjusting claims; storing driving habits on file such as for the purpose of determining safe driving, which may be associated with changes in insurance prices based on driving speed. The picture or recording location tracking may support bounty hunters, private investigators, police, detectives, or other in, for example, tracking people. For example, tracking 1200 may support tracking a stalker, for example, in determining a distance in relation to another person where, in some embodiments, an alert that may be sent to police is sent if the stalker is too close to a person.

In embodiments, the tracking 1200 may support a maid service in, for example, tracking the time that a maid spends at a location and, perhaps, comparing the actual billed charges to the tracked time.

In embodiments the tracking 1200 may support fleet management in, for example, tracking the dwell time of a vehicle in the fleet on a location and, perhaps, comparing an actual billed charge to the tracked dwell time at a location, which may be a tracked location 1202. This tracking 1200 may serve a purpose in project accounting.

The tracking 1200 may support armored cars in, for example, tracking locations of the armored cars and, perhaps, tracking deviation from a set path. The tracking 1200 may support parole tracking such as the tracking of a person, perhaps with respect to an allowable zone, wherein if the person being tracked is outside an allowable zone (such as and without limitation a geofence 900) an alert may be sent. The tracking 1200 may support emergency dispatching, which may be associated with a known location of a person and which may provide directions to the known location. The tracking 1200 may support roadside assistance dispatching, which may be associated with the known location of a person and which may provide directions to the known location. The tracking 1200 may support an alert, which may be an alert where the alert may be without limitation audio, visual, associated with a location that may be user determined, in response to a vehicle, via fax, via email, via instant message, via a text message, via SMS, via an Internet protocol, via voice, via voicemail, in the form of a vibration.

In embodiments, the tracking 1200 may be associated with the location of a lobster trap, wherein the tracking may be further associated with an indication of whether the lobster trap has been previously checked.

In embodiments the tracking 1200 may be associated with social networking, such as, without limitation, introducing certain people to each other; introducing certain groups of people; communicating with at least one individual; and/or communicating with a group of individuals, such as informing them of an event at a location (which may be the location 1202).

Figure 13:
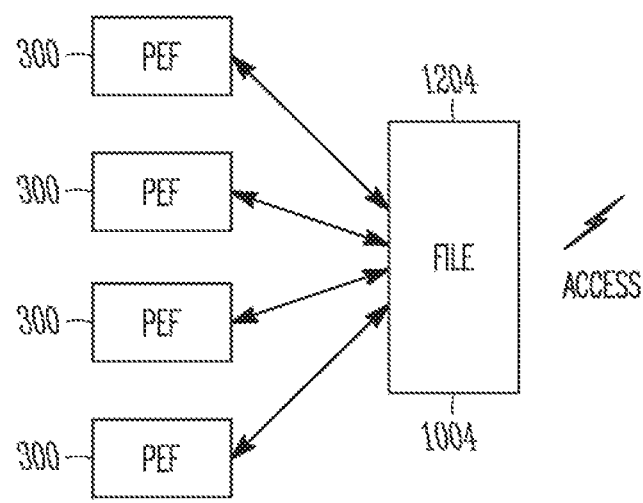
FIG. 13 is a schematic diagram relating to the provision of business information.

Referring now to FIG. 13, the present invention may provide business information by storing the location of a plurality of portable electronic facilities 300, possibly in an electronic storage file 1004 or a location-containing file 1204, which may be remote. The invention may provide access to the storage file 1004 or 1204, which may contain information pertaining to demographics, locations and motion of the portable electronic facilities. Access to the storage file 1004 or 1204 or information may be password protected and the storage file 1004 or 1204 or information may be encrypted. The storage file 1004 or 1204 may be an XML document, a database, a table or a text file.

The invention may provide demographic information associated with the portable electronic facilities 300, such as the number and types of facilities 300 with particular demographic or other characteristics in a certain area or the speed and location of the facilities 300. For example, location information may be associated with demographic information or information about past behavior of users of portable electronic facilities 300, to determine the characteristics of users in an area. For example, if many users within a geofence 900 that is associated with a large retail store are shown to have high income and to be interested in electronics, then the store can make an announcement about a high-end electronics item that is for sale. Similarly, if many users within the area of a restaurant have a preference for a particular food (based on past purchases), then the restaurant can prepare to serve that food, such as by ordering and offering that food. Thus, a system may include a geofence for establishing a proximity of a location and may track or take actions based on the characteristics of users within that geofence, such as determined by past actions of those users, such as purchases, browsing, or other behavior performed by the users using their portable electronic facilities 300.

In embodiments, tracking information may constitute traffic patterns, and such traffic patterns may be compared to historical traffic patterns for infrastructure design.

Figure 14:
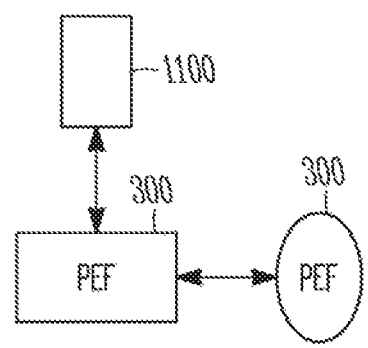
FIG. 14 is a block diagram relating to effecting change on a portable electronic facility.

Referring now to FIG. 14, the present invention may provide methods and systems for effecting change on a portable electronic facility 300 in response to location information 1100. The method may involve receiving location information 1100 on the portable electronic facility 300 and effecting a change on the portable electronic facility based on the location information 1100. The change may involve activating the portable electronic device, powering off portable electronic device, placing the portable electronic device in standby mode, starting an application, stopping an application or the output of information. The output may involve audio, video, a picture related a location, fax, email, instant message, text message, SMS, internet protocol, voice, voicemail, vibration, stimulation at least one of the five senses or an alert. The alert may involve fax, email, instant message, text message, SMS, internet protocol, voice, voicemail, vibration or stimulation of at least one of the five senses.

In another embodiment the change may involve a reminder regarding an item on a list and the list may be a geocentric list. For example, the reminder may be to purchase an item at a location in close proximity to the portable electronic facility 300. For example, a user's grocery list may be presented in response to the user entering a geofence 900 that is defined around a grocery store. In another example, the reminder may be to perform a task at a location in close proximity to the portable electronic facility 300. For example, in arriving within a geofence 900 that is defined around a friend's home, a user may be reminded to drop off an item at the friend's house. Thus, the methods and systems described herein include location-based reminders, to do lists, and task lists, and in embodiments the location-based reminders are triggered by the proximity of a portable electronic facility 300 to a geofence 900 that is defined by a user of the portable electronic facility 300.

In another embodiment the change may involve a change to at least one item on a menu. For example, the change may be the removal or addition of a class of point of interest from or to a menu. For example, the class of point of interest may be a hotel, store or tourist location. For example, when a user is far from home, nearby locations of stores, tourist locations and hotels may be presented to a user in the user interface, but such locations may be removed from the menu when the user is close to home, on the assumption that a user is familiar with stores near the user's home and that the user will not need hotel or tourist information near home. In embodiments a portable electronic facility 300 may allow a user to modify preferences for what items are presented when a user is near a particular location or far from that location.

In another embodiment the change may affect the availability of an application. The change may also involve enabling free calling when within a certain geofence, such as within a home or a user defined geofence. Thus, a telecommunications system may track user locations through their portable electronic facilities 300, and may determine the presence of a user within a geofence 900 associated, for example, with a home, business, school, or other location of the user. The telecommunications system may vary the rate charged to the user based on proximity to the geofence 900.

In embodiments location information 1100 may relate to the accuracy of the location information or be stored in relation to a particular location, coordinate (such as Cartesian or polar coordinates), latitude, longitude or altitude. The information may refresh continuously, in accordance with set preferences or in response to a request. The frequency of the requests may be varied in response to speed, location, specified preferences, proximity to a point of interest, or changes in a geofence 900. The frequency of the requests may also be varied in such a manner as to have the effect of extending the battery life of the portable electronic facility 300. Thus, a power management application may manage the use of a location-based application based on the location of a user to preserve battery life in a portable electronic facility 300.

In embodiments, a user may make a request, such as a request for help, such as in response to pressing a panic button or activating a panic mode on a portable electronic facility 300. The request for help may include location information 1100, information relevant to the emergency or other information. The request may include a picture or recording taken by a camera of the portable electronic facility 300, and the picture or recording may have embedded in it location information.

In embodiments the location information 1100 may be received via SMS, fax, email, instant message, text message, internet protocol, voice, voicemail, GPRS, CDMA, W AP protocol, internet, text or as a file.

Figure 15:
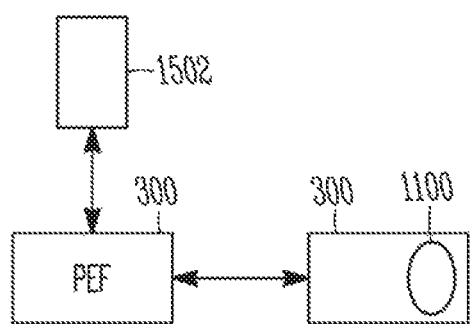
FIG. 15 is a schematic diagram relating to outputting location-based information on a portable electronic facility.

Referring now to FIG. 15, the present invention may provide for methods and systems of triggering the output of location-based information 1100 involving receiving information via a portable electronic facility 300 and outputting location-based information 1100 based on the received information.

The information 1100 may be received via a sensor 1502, which may measure the parameters of a device, facility 300 or vehicle. The sensor may provide information relating to the fuel-level of a vehicle. The fuel may be gasoline, diesel, propane, hydrogen, alcohol-based or ethanol. The sensor may transmit the information via Bluetooth or by other means. In embodiments the location-based information 1100 may consist of a list of fueling stations in the area, fuel prices and hours of operation. The sensor may also enable monitoring and the location-based information 1100 may be relevant to the monitoring.

Figure 16:
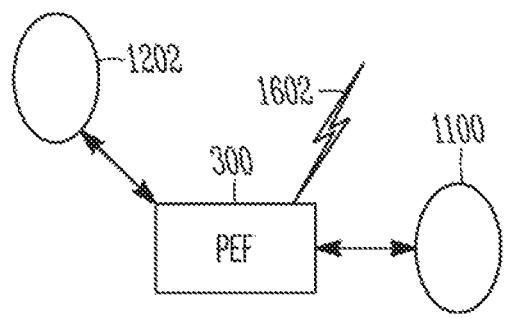
FIG. 16 is a schematic diagram relating to location determination.

Referring to FIG. 16, the present invention may provide methods and systems for location determination involving capturing characteristics of a location 1202 using a portable electronic facility 300, transmitting those characteristics and receiving location based information 1100. The characteristics may be captured as a picture, a photograph, verbally or using at least one sensor. The picture may be entered by a user. The photograph may be taken with a camera on the portable electronic facility 300. The sensor may be a temperature sensor, a velocity sensor, a direction sensor, an altitude sensor, a pressure sensor, a fluid level sensor or a power level sensor. The characteristics may be transmitted via SMS, fax, email, instant message, text message, internet protocol, voice, voicemail, GPRS, CDMA, WAP protocol, internet, text or as a file.

Figure 17:
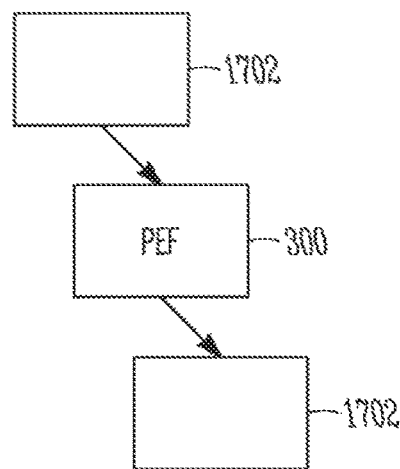
FIG. 17 is a schematic diagram relating to varying transmissions to and from a portable electronic facility.

Referring to FIG. 17, the present invention may provide methods and systems of varying transmissions 1702 for a portable electronic facility 300 involving varying information transmissions 1702 to a portable electronic facility 300 and varying information transmissions 1702 from a portable electronic facility 300. The length or frequency of the transmissions 1702 may be varied. The variation may be in response to velocity, direction, location, a point of interest, an object, preferences, a location with respect to a geofence or changes in a geofence. The variation may result in increased battery life for the portable electronic facility 300.

The data may be stored and transmitted all at one or it may be transmitted as it is updated. The data may be location information 1100.

In an embodiment the information transmissions may be from multiple sources. The multiple sources may be different networks or different means of communication. The means of communication may be SMS, fax, email, instant message, internet protocol, voice, voicemail, GPRS, CDMA, WAP protocol, internet or text. The information may be transmitted in a costless manner, a cost reduced manner or in the form of a DNS lookup.

Referring again to FIG. 17, the present invention may provide methods and systems of increasing the quality of location based information 1100 for a portable electronic facility 300, involving varying information transmissions 1702 to a portable electronic facility 300 and varying information transmissions 1702 from a portable electronic facility 300. The length or frequency of the transmissions 1702 may be varied. The variation may be in response to velocity, direction, location, a point of interest, an object, preferences, a location with respect to a geofence or changes in a geofence. The variation may result in increased battery life for the portable electronic facility 300. The data may be stored and transmitted all at one or it may be transmitted as it is updated. The data may be location information 1100.

In an embodiment the information transmissions may be from multiple sources. The multiple sources may be different networks or different means of communication. The means of communication may be SMS, fax, email, instant message, internet protocol, voice, voicemail, GPRS, CDMA, WAP protocol, internet or text. The information may be transmitted in a costless manner, a cost reduced manner or in the form of a DNS lookup.

Figure 18:
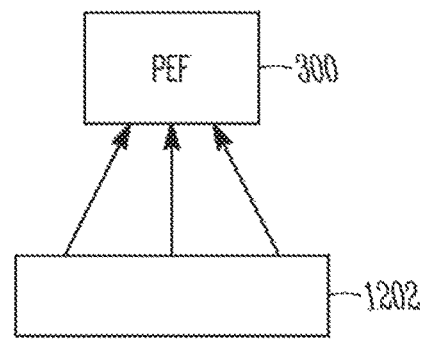
FIG. 18 is a schematic diagram relating to increasing the quality of location based information on a portable electronic facility.

Referring to FIG. 18, the present invention may provide methods and systems of increasing the quality of location based information 1100 for a portable electronic facility 300 involving obtaining multiple data points for a given item of information or a location 1202. The multiple data points may be analyzed and outliers dropped. The analysis may be performed using an algorithm. The item of information may relate to location, velocity or direction.

Figure 19:
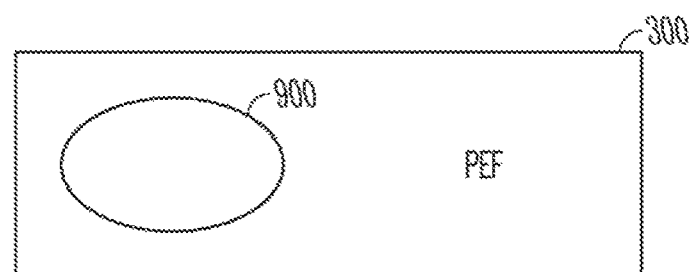
FIG. 19 is a block diagram related to defining a geofence on a portable electronic facility.

Referring to FIG. 19, the present invention may provide methods and systems of defining a geofence 900 on a portable electronic facility 300 involving inputting the geofence 900 using the portable electronic facility 300. The center and a radius of a geofence 900 may be entered on the portable electronic facility 300. The geofence 900 may be defined using a cursor on the display of the portable electronic facility 300. The geofence 900 may be defined using a touch screen on the portable electronic facility 300. The geofence 900 may be defined by the location of the portable electronic facility 300. The geofence 900 may be defined by placing the portable electronic facility 300 at certain points comprising the geofence 900. The geofence 900 may be defined in real time by placing the portable electronic facility 300 at certain points comprising the geofence 900. The geofence 900 may be manipulated using the portable electronic facility 300. The geofence 900 may be moved using the display of the portable electronic facility 300. The geofence 900 may be moved using the portable electronic facility 300. The geofence 900 may be a circle, a sphere, in the shape of any closed polygon, a closed volume, in two dimensions, in three dimensions or may travel with a person.

In certain embodiments the location of the portable electronic facility 300 with respect to the geofence 900 may result in the transmission of information 1702 to the portable electronic facility 300. The information may relate to a coupon, the weather or traffic conditions. In other embodiments the information and geofence 900 may be used for social networking. For example, all or certain of the portable electronic facilities 300 within a geofence 900 may receive information or all or certain of the portable electronic facilities 300 outside a geofence 900 may receive information.

In another embodiment, services may be linked to a geofence 900. For example, all or certain portable electronic facilities 300 located within a geofence 900 may receive or be eligible to receive certain services or all or certain of the portable electronic facilities 300 located outside a geofence 900 may receive or be eligible to receive certain services. The service may be a game, application or coupon. The price for a service may be varied with the location of a portable electronic facility 300 in relation to a geofence 900. For example, a cell phone may be allowed to place calls at no additional cost if located within a certain geofence 900, for example a geofence 900 corresponding to the home of the cell phone owner. In another example a portable electronic facility 300 may be able to receive and transmit information at no additional cost when located within a certain geofence, such as the home area of the portable electronic facility 300.

Figure 20:
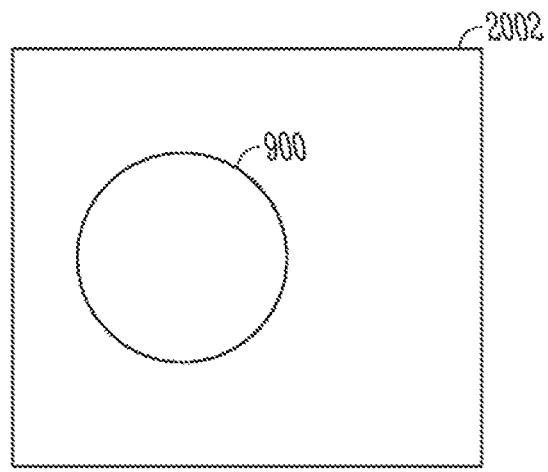
FIG. 20 is a block diagram related to defining a geofence on a computer.

Referring to FIG. 20, the present invention may provide methods and systems of defining a geofence 900 on a computer screen or similar graphical user interface 2002 involving inputting the geofence 900 through a user interface. The geofence 900 may be defined or moved about the interface using a pointing device such as a mouse or stylus. The radius, shape or dimensions of the geofence 900 may also be defined or changed using a pointing device such as a mouse or stylus. The user interface may b e web-based and the geofence 900 may be defined on a server. The geofence 900 may be a circle, a sphere, in the shape of any closed polygon, a closed volume, in two dimensions, in three dimensions or may travel with a person.

Figure 21:
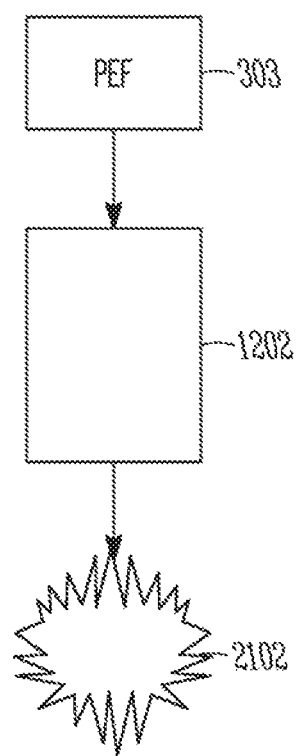
FIG. 21 is a schematic diagram relating to sending location-based alerts.

Referring to FIG. 21, the present invention may provide methods and systems of sending location-based alerts 2102 involving determining the location 1202 of a portable electronic facility 300 and sending an alert 2102 based on the location 1202 of the portable electronic facility 300. The alert 2102 may be in response to the location of a portable electronic facility 300 with respect to a geofence 900. The alert 2102 may be sent if the portable electronic facility 300 is within or outside a geofence 900 or within or outside a geofence 900 for a certain period of time. The alert 2102 may be sent if a portable electronic facility 300 enters or exits a geofence 900 or enters or exits a geofence 900 for a certain period of time. An alert 2102 may be contingent on the location of other portable electronic facilities 300 or the location of other portable electronic facilities 300 with respect to a geofence 900. The alert 2102 may be affected by the location of other portable electronic facilities 300 or the location of other portable electronic facilities 300 with respect to a geofence 900.

In one embodiment, the geofence 900 may define a place of business. The alert 2102 may be in response to a certain employee or employer arriving or not arriving at work. The alert 2102 may also be in response to a certain employee or employer arriving or not arriving at work by a specified time.

In another embodiment, the geofence 900 may define a home. The alert 2102 may be in response to a certain child, teenager or vehicle arriving or not arriving at home. The alert 2102 may also be in response to a certain child, teenager or vehicle arriving or not arriving at home by a specified time.

In another embodiment, the geofence 900 may define an airport. The alert 2102 may be in response to a passenger arriving or departing. The geofence 900 may also define a city. The alert 2102 may be in response to a passenger or a shipment arriving or departing.

The alert 2102 may be via audio, video, fax, email, instant message, text message, SMS, internet protocol, voice, voicemail, vibration or may stimulate at least one of the five senses. The alert 2102 may be communicated via one of the following means of communication: SMS, fax, email, instant message, internet protocol, voice, voicemail, GPRS, CDMA, WAP protocol, internet or text.

Figure 22:
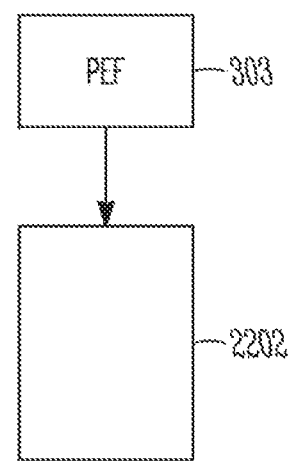
FIG. 22 is a schematic diagram relating to analyzing information related to at least one portable electronic facility.

Referring to FIG. 22, the present invention may provide methods and systems of analyzing information related to at least one portable electronic facility 300 involving transmitting information from the at least one portable electronic facility 300 and analyzing such information using an analysis engine 2202. The information from one or more portable electronic facilities 300 may be stored or aggregated. The analysis engine 2202 may provide the ability to view location history or analyze location history. The analysis engine 2202 may also request additional information or send alerts 2102.

The analysis engine 2202 may perform analytics on location information such as demographic analysis, predictive analysis and descriptive analysis. The analysis may be for retail purposes, marketing purposes or security purposes. The analysis engine 2202 may determine the types of portable electronic facilities 300 or people at a given location. The analysis engine 2202 may determine the class of people at a given location. The class of people may be specified based on the following characteristics: income level, profession, race, ethnicity, gender, sex, sexual orientation, address, age, disposable income level, number of children, education level or health factors. The analysis engine 2202 may determine the route by which a person arrived at a location. The analysis engine 2202 may also determine the routes by which a class of people arrived at a location. The analysis engine 2202 may also determine the locations of a type of portable electronic facility 300. The information provided by the analysis engine 2202 may include purchasing information, personal preferences, demographics or consumer purchasing data relating to individual consumers or classes of consumers.

Access to the analysis engine 2202, the system and information may be granted at different access levels. A user may be granted partial or restricted access via a guest login. It may be that whether a user is permitted to know the location of another user is determined based on the access levels of the users.

Figure 23:
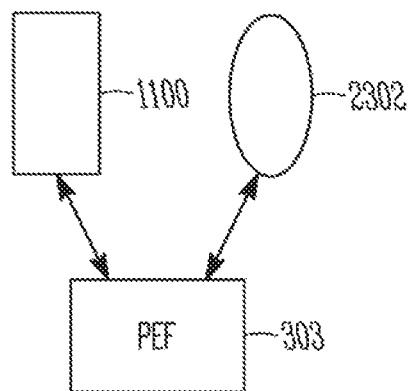
FIG. 23 is a schematic diagram relating to verifying a transaction using a portable electronic facility.

Referring to FIG. 23, methods and systems disclosed herein may include methods and systems for verifying a transaction using a portable electronic facility 300. In such embodiments, the location of a portable electronic facility 300 may be linked to a location of a transaction 2302, such as to verify the presence of a user in proximity to the use of the user's credit card, debit card, portable electronic transaction device, or other device. In embodiments the transaction is made using the Internet from a user's home computer, and the tracking information confirms the presence of the user at home by locating the user inside a home geofence 900.

Figure 24:
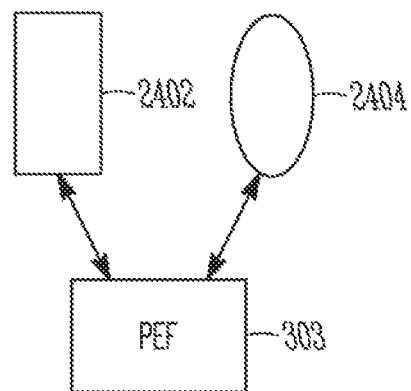
FIG. 24 is a schematic diagram relating to tailoring information to the behavior of a user.

Referring to FIG. 24, methods and systems disclosed herein may include methods and systems for tailoring information to the behavior of a user 2402, such as observing the behavior of a user 2402 and communicating information 2404 to the user by a portable electronic facility 300, such as information 2404 based on the observed behavior of a user 2402. The observed behavior 2402 may include behavior that is tied to locations, such as shopping behavior, purchasing behavior, or the like. In embodiments information may be presented to the user about alternate locations for shopping or purchasing for alternative, similar or complementary goods and services to those being shopped by the user at the tracked location. In embodiments the tracked behavior may indicate personal preferences, may constitute marketing information, or may be observed or inferred behavior based on past actions of the user.

Figure 25:
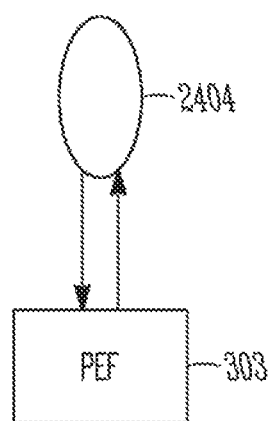
FIG. 25 is a schematic diagram relating to providing information to a portable electronic facility based on information received from the portable electronic facility.

Referring to FIG. 25, methods and systems disclosed herein may include methods and systems for providing information 2404 to a portable electronic facility 300 based on information 2404 received from the portable electronic facility 300, including location information 1100. In embodiments the portable electronic facility 300 may have instant messaging capabilities, and an instant message may embed the location of the user such as a real-world location or an indication of location, such as proximity to a geofence 900, such as designed as "home," "work," or the like.

Figure 26:
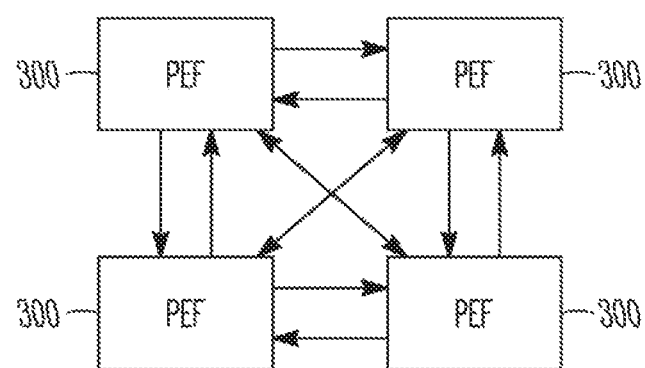
FIG. 26 is a block diagram presenting a network of portable electronic facilities.

Referring to FIG. 26, a network of portable electronic facilities 300 may be provided, allowing communication among portable electronic facilities 300, including information based on the tracked locations of the portable electronic facilities 300. In embodiments information is communicated directly among the portable electronic facilities 300, without use of a central server. In embodiments information may be communicated by SMS, fax, email, instant message, internet protocol, voice, voicemail, GPRS, CDMA, WAP protocol, internet and/or text. In embodiments the portable electronic facilities 300 may share information that includes or is based upon location information, such as a file, a music file, a movie, a game, an application, a ringtone, a text file, a document, or an email.

Figure 27C:
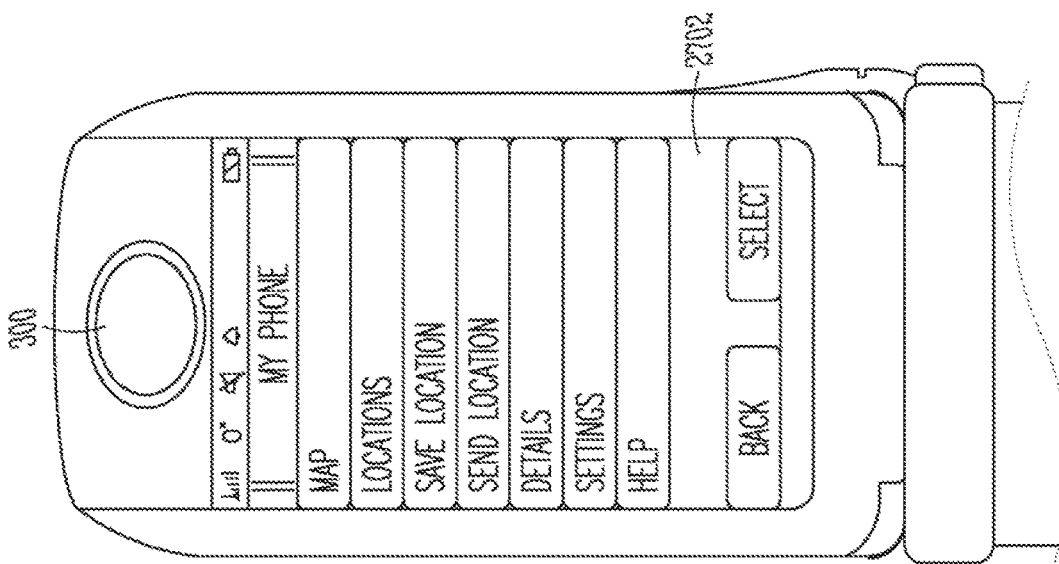
FIGS. 27A-27C present several graphical user interfaces that may be presented on a portable electronic facility.
Figure 27B:
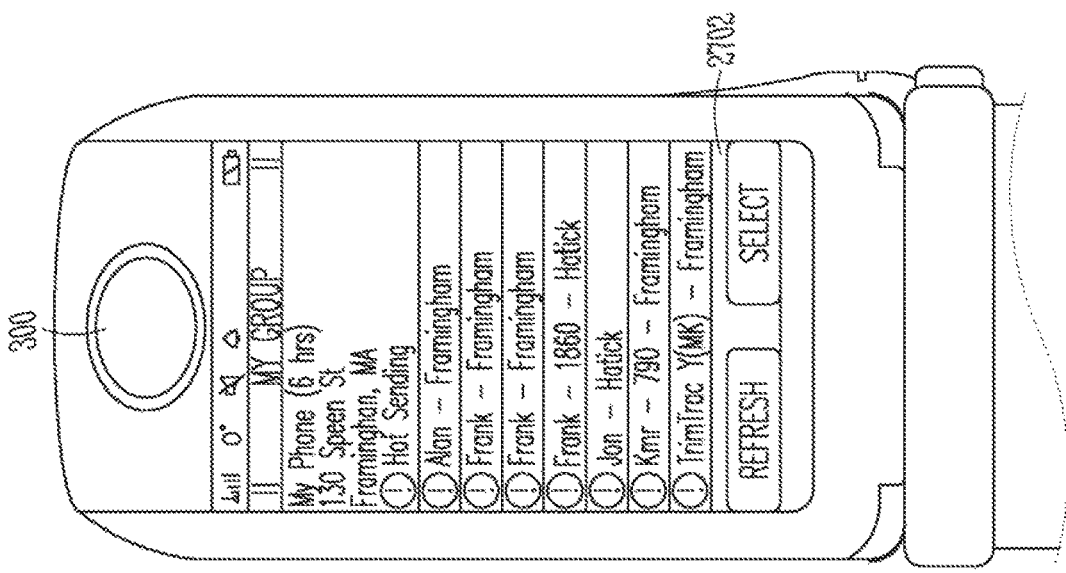
Figure 27A:
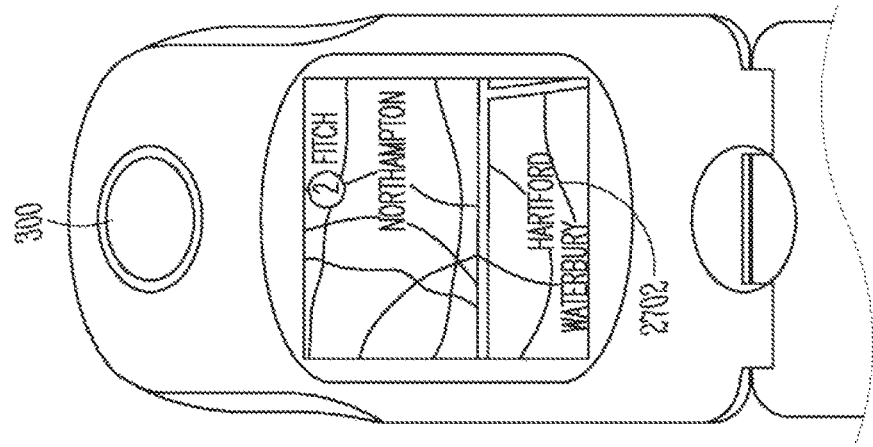
Figure 28:
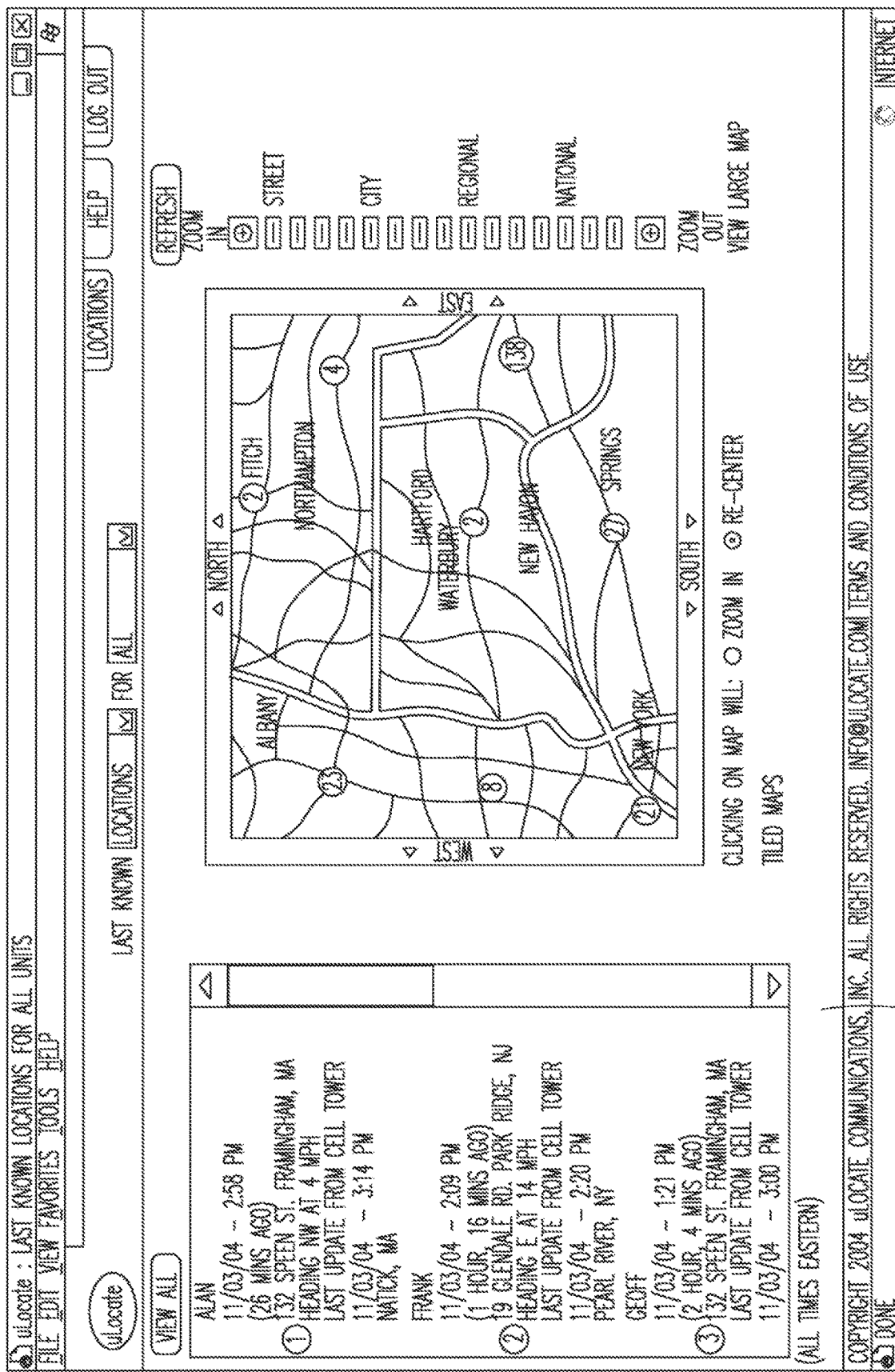
FIG. 28 depicts a graphical user interface providing an overview of the locations of all the users in a defined group.
Figure 29:
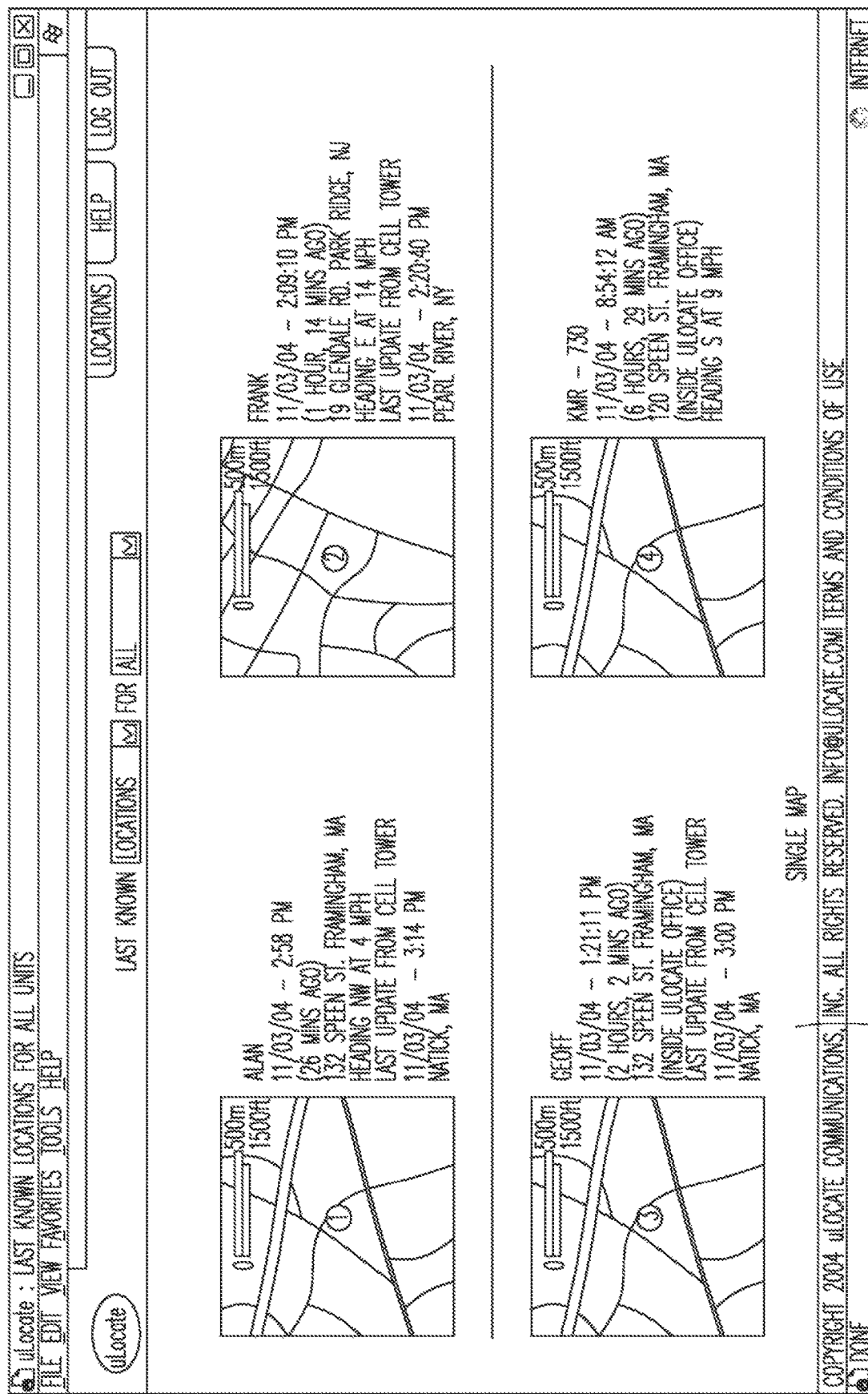
FIG. 29 provides a view of the locations of the users in a defined group.
Figure 30:
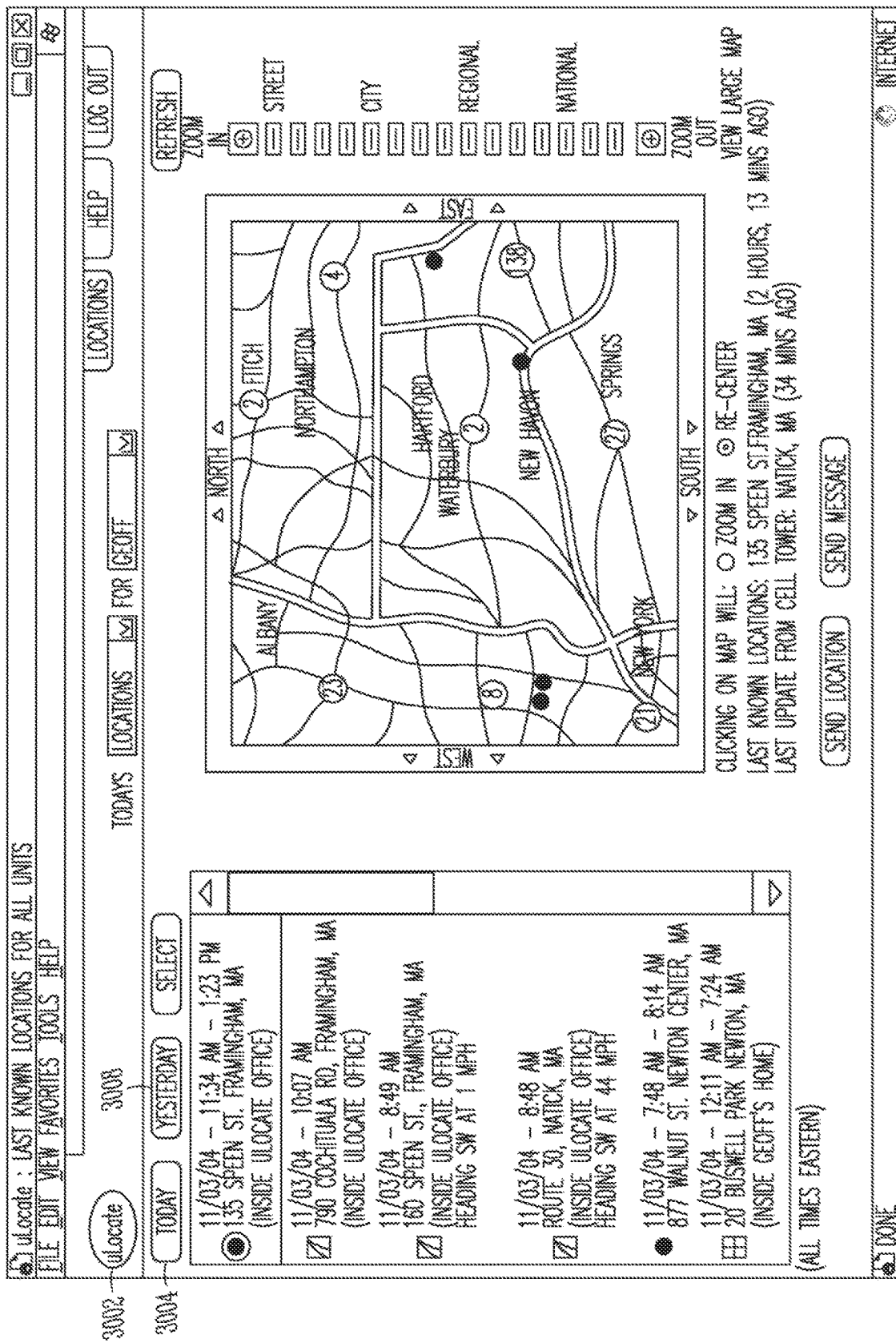
FIG. 30 presents a detailed display of the location information for one particular user.

FIGS. 27A-C present several examples of the possible graphical user interfaces 2702 that may be presented on a portable electronic facility 300, such as a mobile phone. The interface may display a map or a menu. FIG. 28 depicts a graphical user interface 2802 providing an overview of the locations of all the users in a defined group. The users may be individual drivers in a fleet of delivery trucks. FIG. 29 provides another view 2902 of the locations of the users in FIG. 29. The view may involve the use of tiled maps. FIG. 30 depicts a detailed display 3002 of the location information for one particular user. The "today" and "yesterday" buttons 3004, 3008 may allow for the rapid toggling between data for different dates. FIG. 31 depicts a stop report 3102, as described above, for a particular user.

Figure 32:
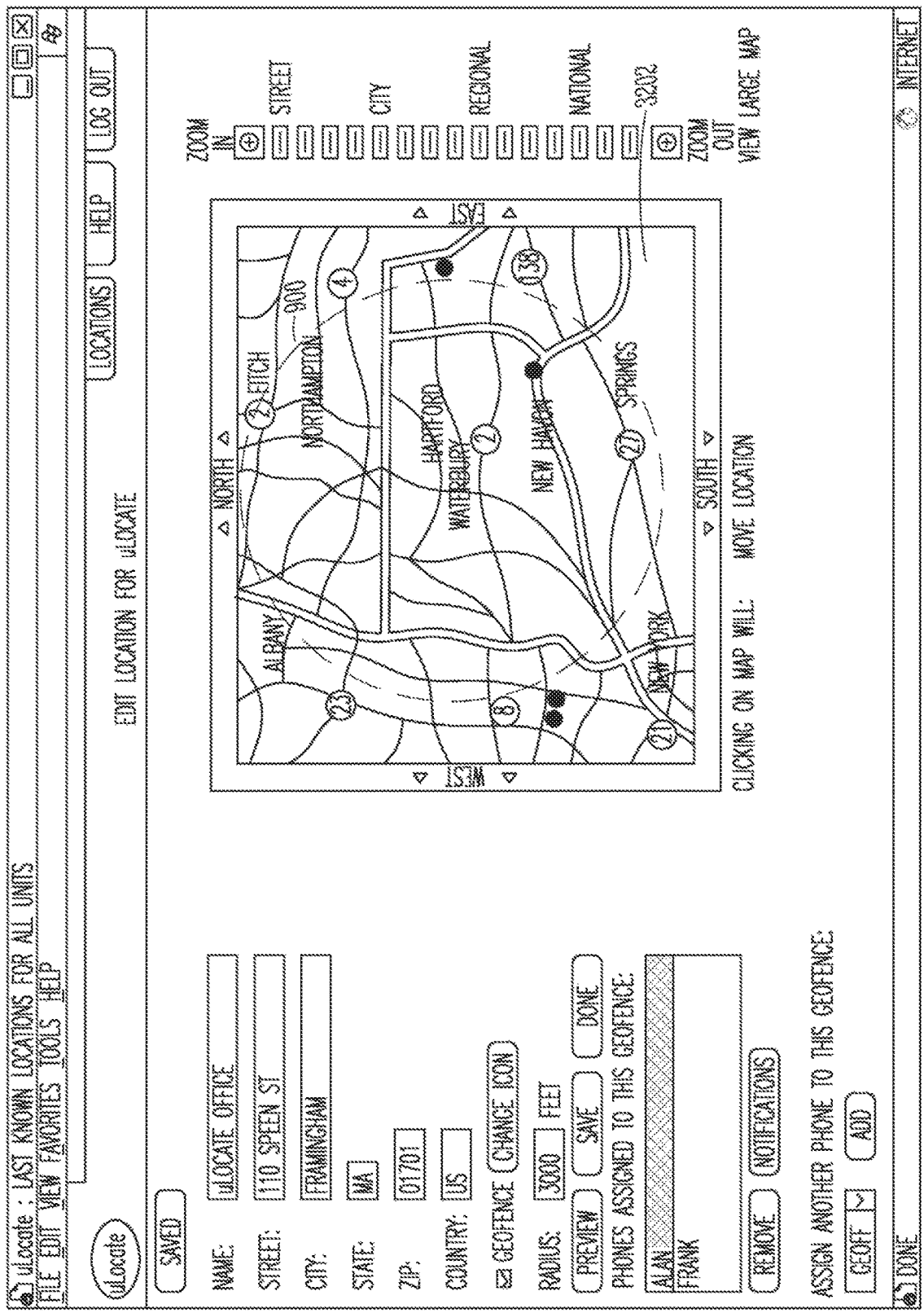
FIG. 32 shows a geofence.
Figure 35:
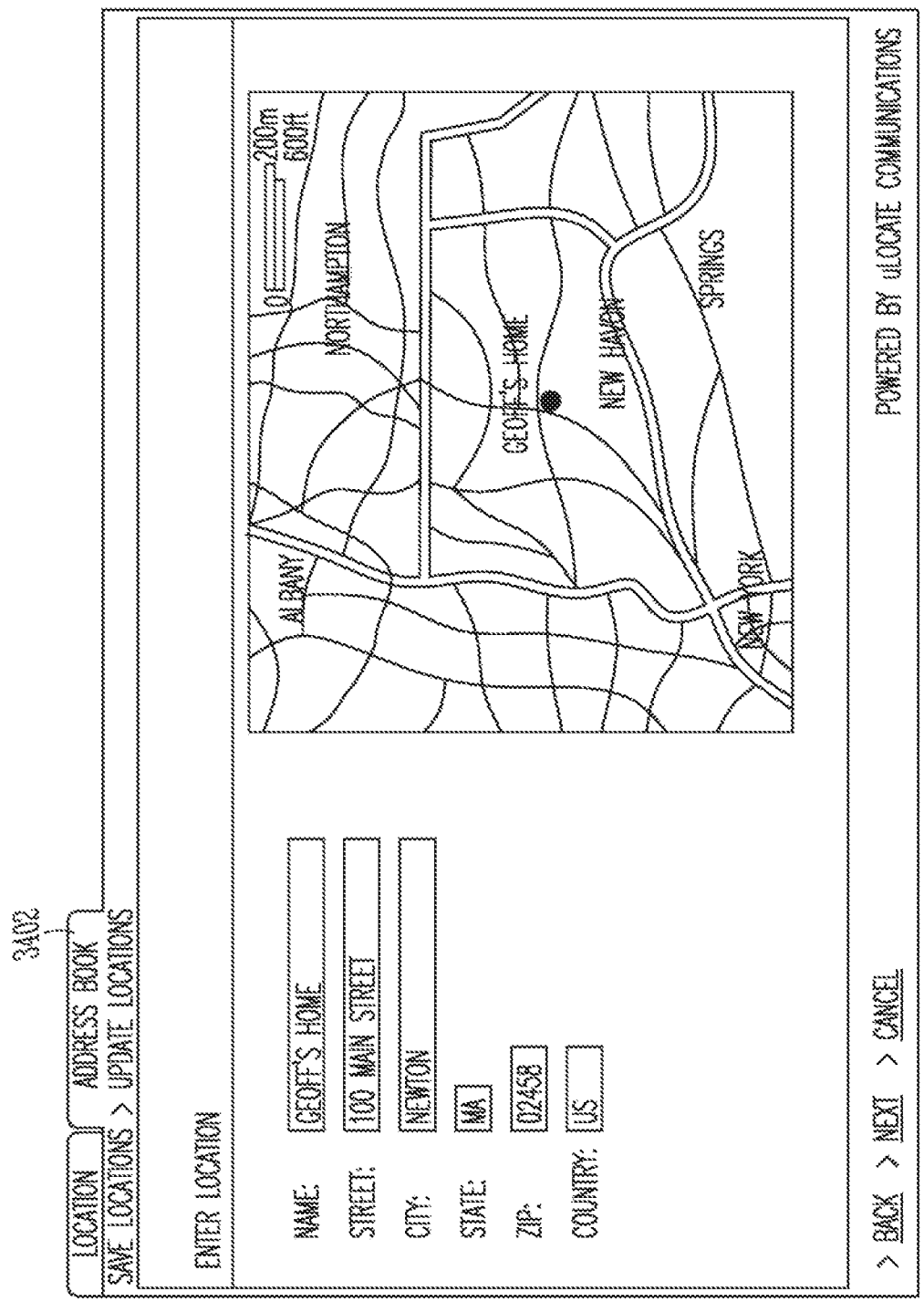
FIG. 35 presents a more detailed view an address book.
Figure 37A:
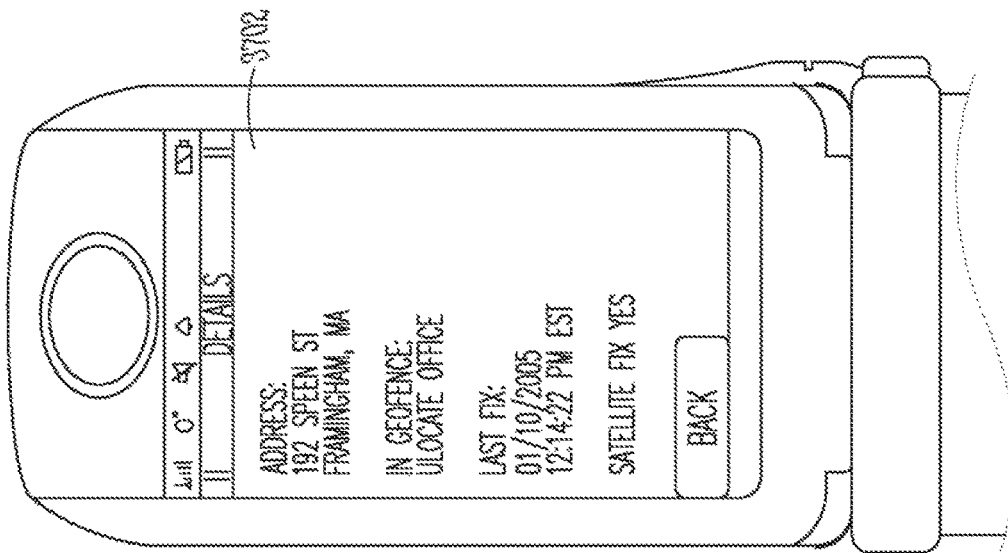
FIGS. 37A-37C depict location details as both lists and maps.
Figure 37B:
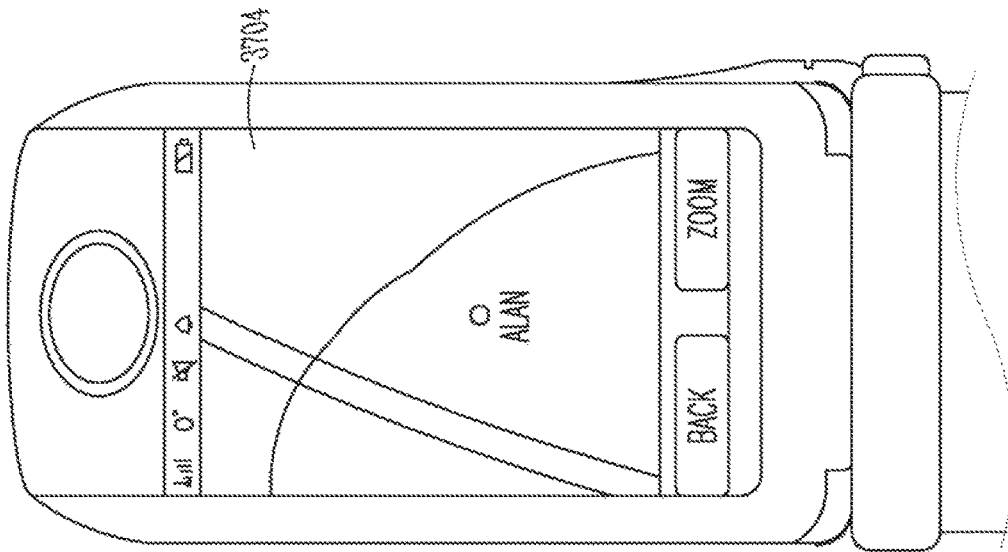
Figure 37C:
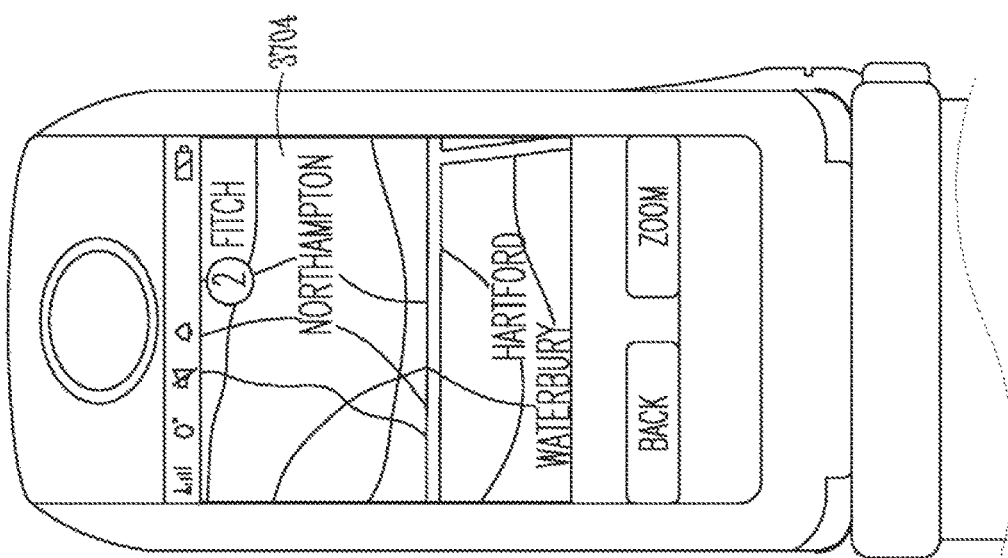
Figure 38C:
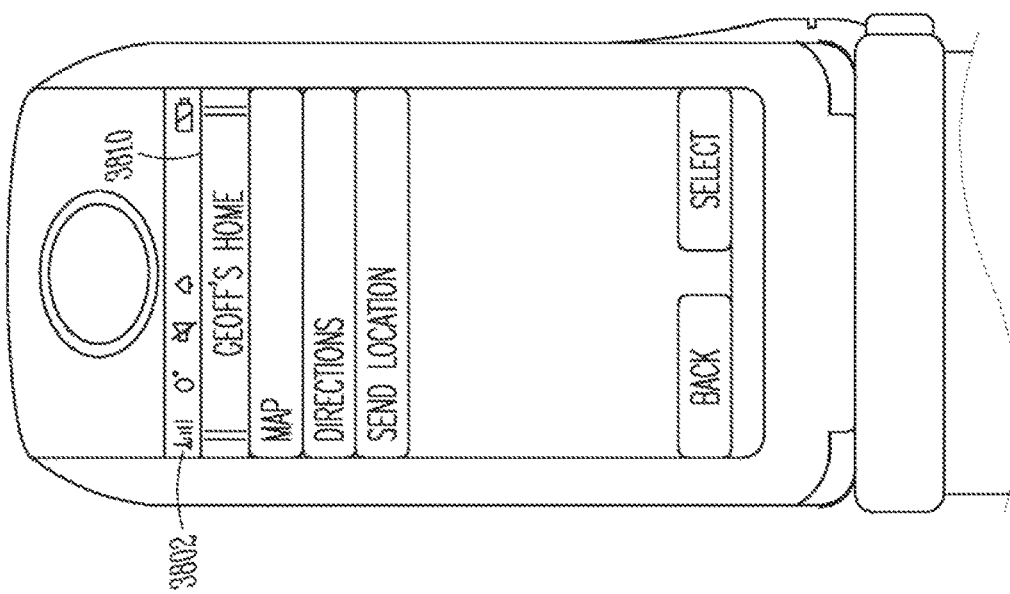
FIGS. 38A-38C depicts several menus related to storing location-based information.
Figure 38B:
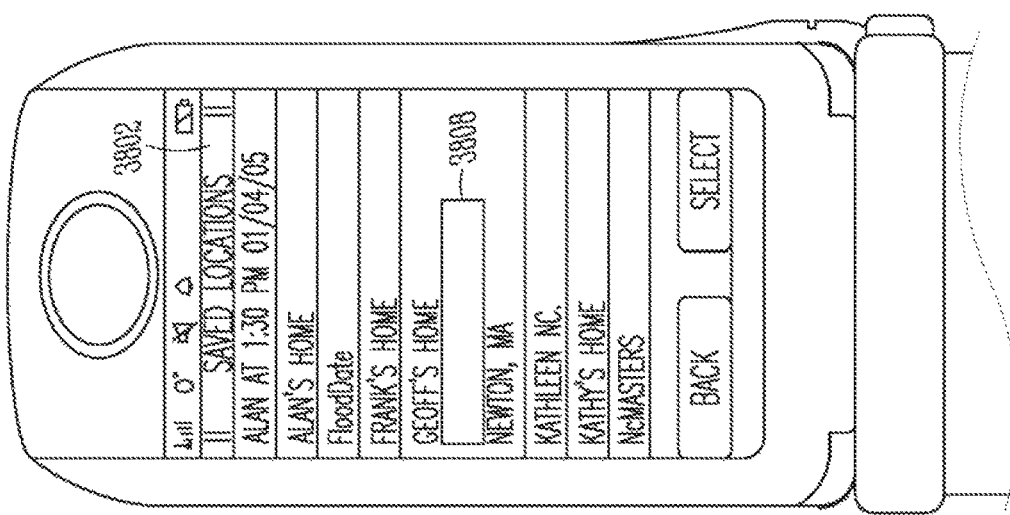
Figure 38A:
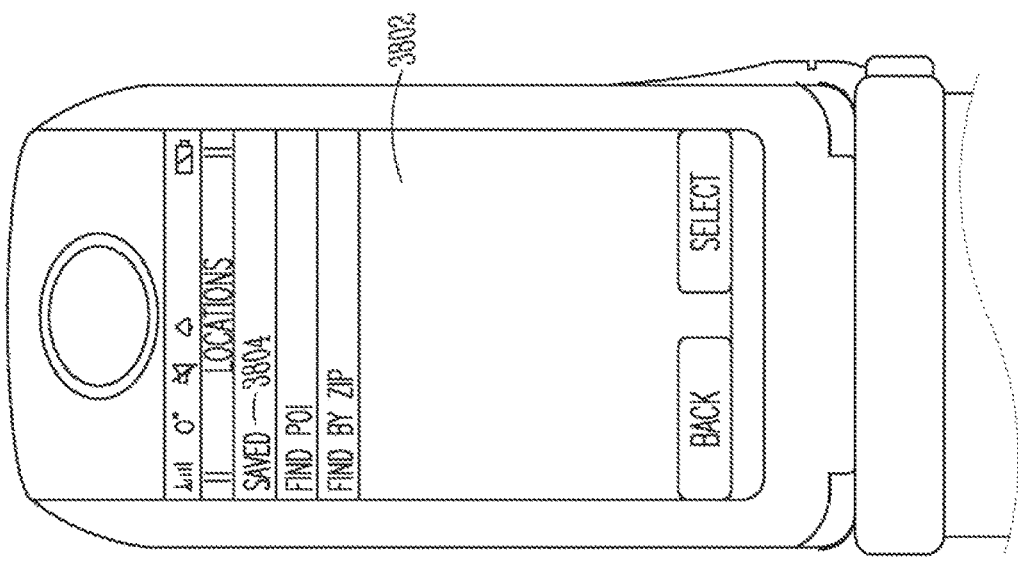
Figure 39B:
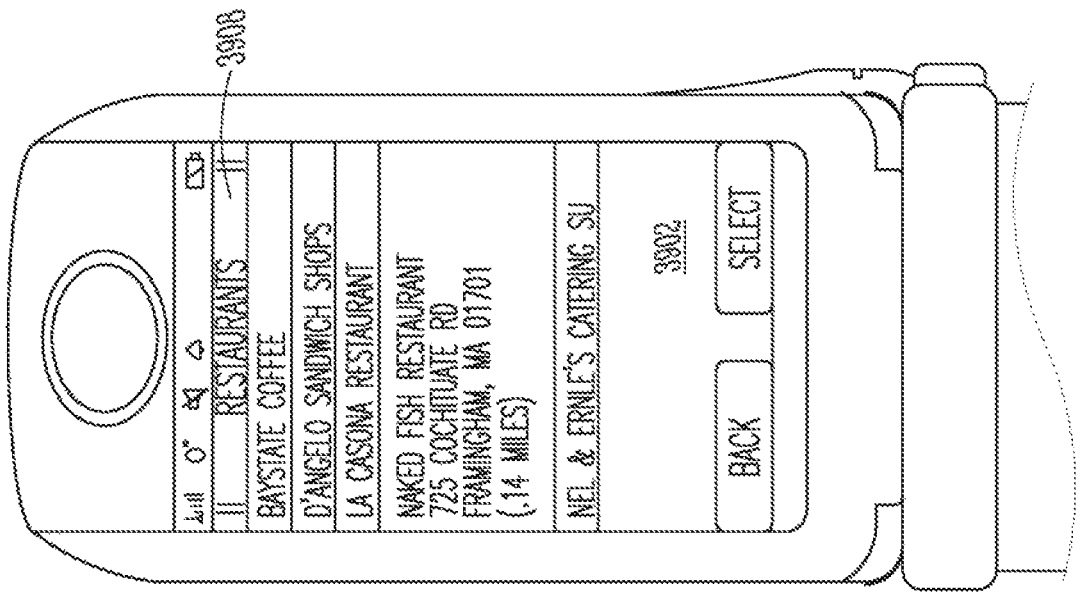
FIGS. 39A-39D depict several graphical user interfaces related to the presentation of points of interest on a portable electronic facility.
Figure 39A:
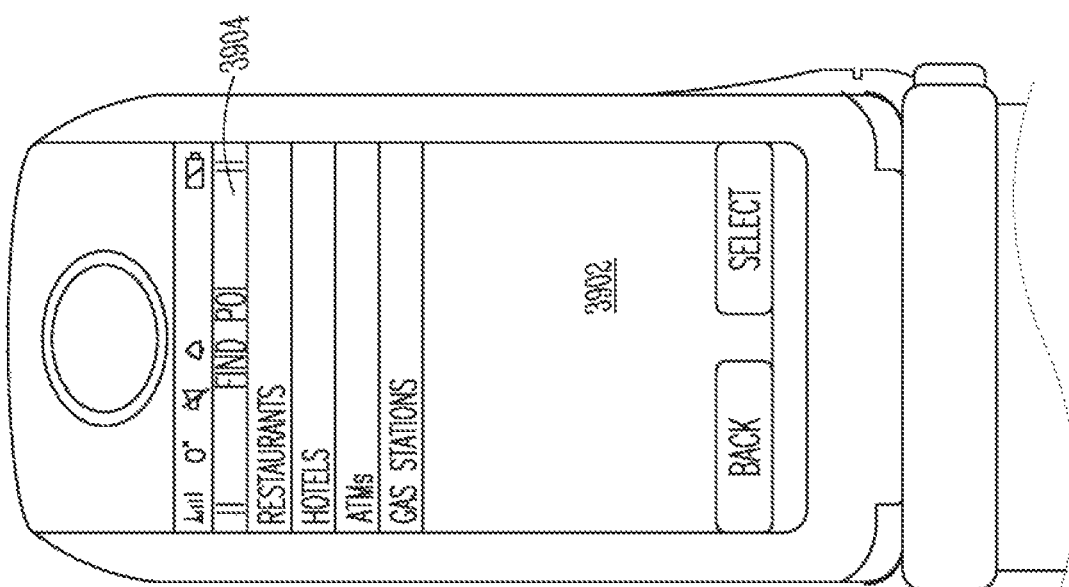
Figure 39D:
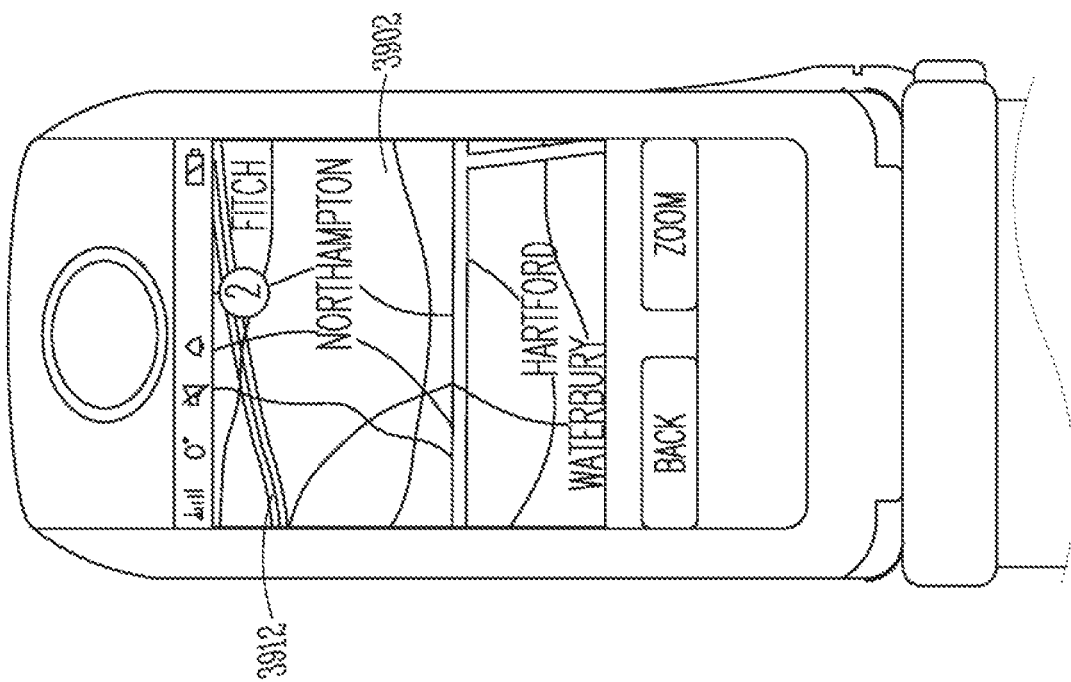
Figure 39C:
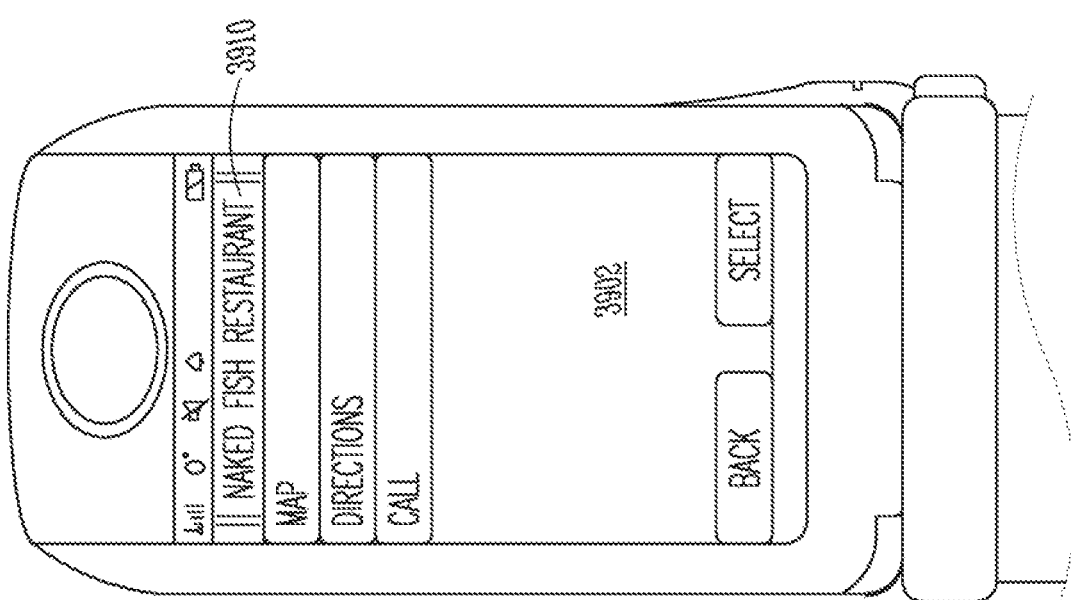
Figure 41:
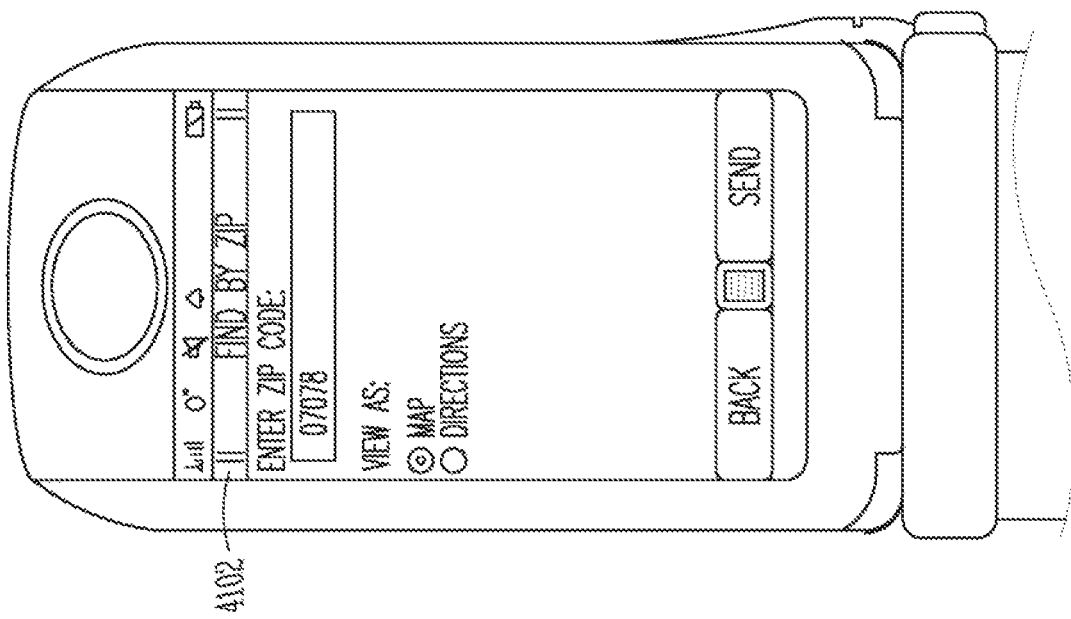
FIG. 41 presents a graphical user interface that may allow a user to input a zip code.
Figure 40:
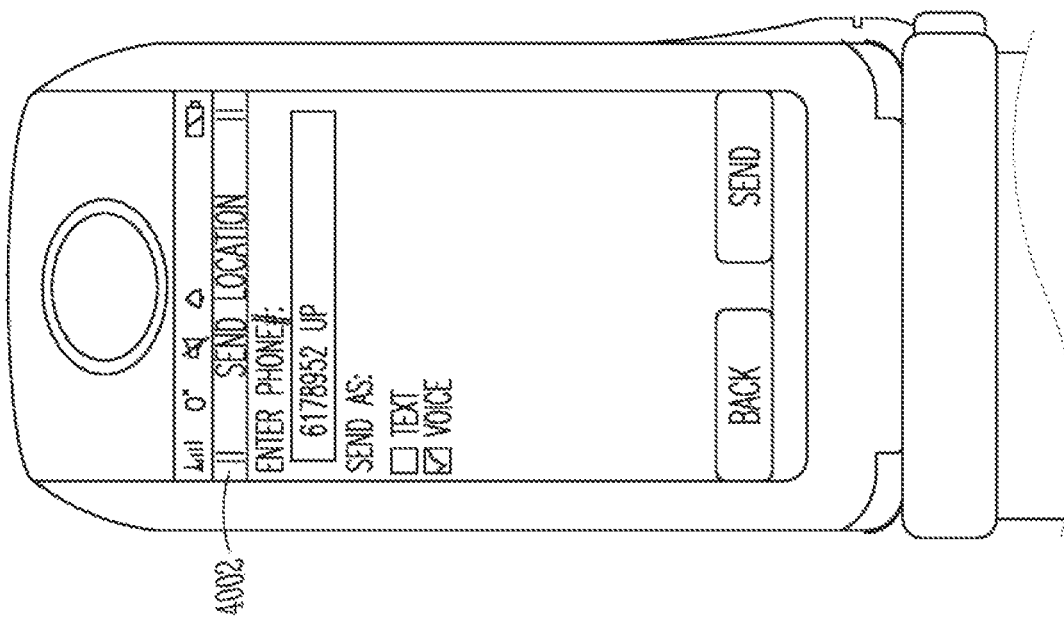
FIG. 40 presents a graphical user interface that may allow a user to send location information via email or voice.
Figure 42B:
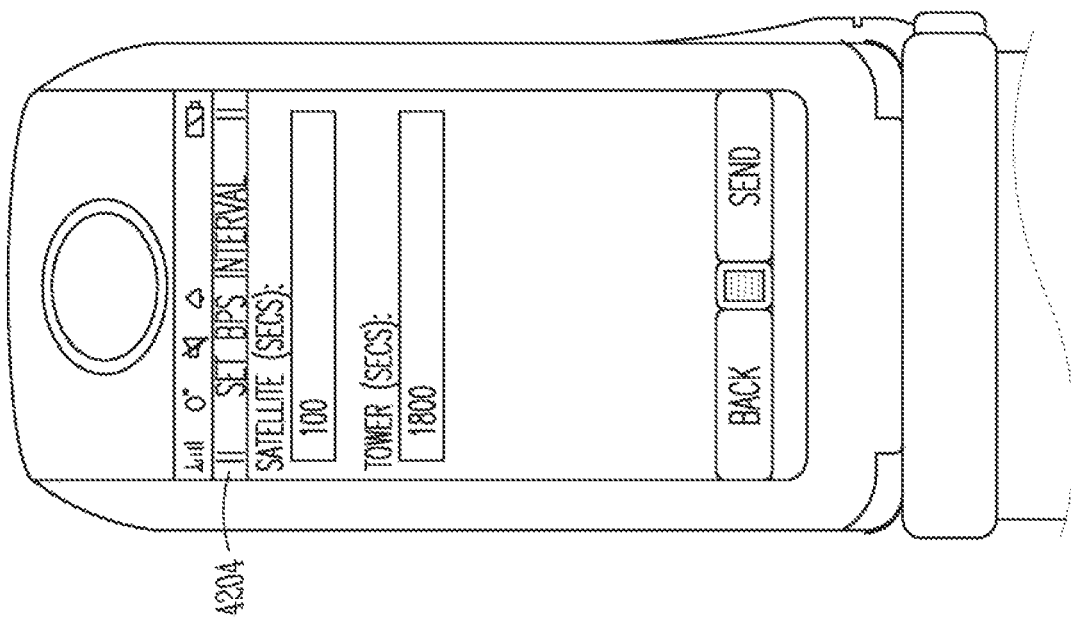
FIGS. 42A-42B presents a graphical user interface that may allow a user to vary the frequency with which a portable electronic device obtains location information.
Figure 42A:
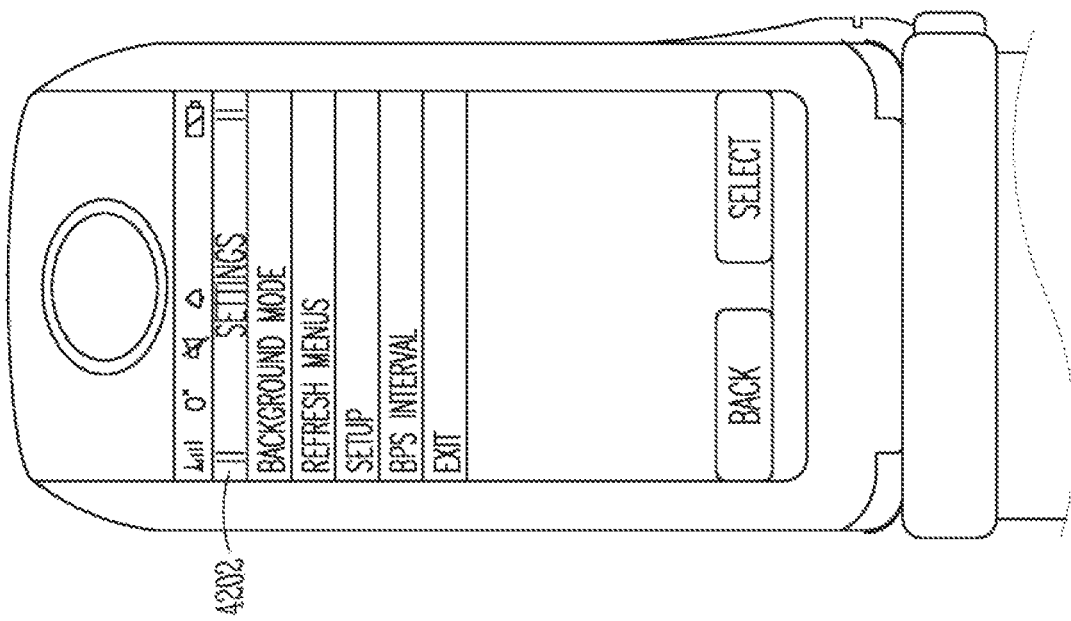

FIG. 32 depicts the definition of a geofence 900 using a map 3202. FIG. 33 shows several icons 3302 that may be assigned to various geofences 900, such as to distinguish different geofences 900 that are created or used for different purposes. For example, a geofence may be designated with a star to signify its importance, or with an icon representing a house to indicate that it is a geofence 900 for a home. FIG. 34 depicts an address book 3402 that may be provided for a user. FIG. 35 presents a more detailed view of one of the entries 3502 in the address book 3402. FIG. 36 depicts a graphical user interface 3602 that may be used to define alerts using the system. FIG. 37A-37C depict location details as both lists 3702 and maps 3704. FIG. 38A-38C depict several menus 3802 related to storing location-based information 1100, including a menu 3804 for finding saved locations, such as by zip code or other data, a menu 3808 displaying detailed locations, and a menu 3810 for displaying options related to a location, such as an option to see a map, to send directions to the location from a particular location, and an option to send the location information to another user. FIG. 39A-39D depict several graphical user interfaces 3902 related to the presentation of points of interest on a portable electronic facility 300, such as an interface 3904 for finding particular types of location, such as hotels, restaurants, automated teller machines, or gas stations, an interface 3908 for showing details of a particular type of location, an interface 3910 for offering options related to a particular type of location, such as the option to see a map, get directions, or call the location, and an interface 3912 for displaying the results, such as showing a map of the location. FIG. 40 presents a graphical user interface 4002 that may allow a user to send location information, such as via email or voice. FIG. 41 presents a graphical user interface 4102 that may allow a user to input a zip code while traveling. FIGS. 42A-42B present a graphical user interface with a setting menu 4202 that may allow a user to vary the settings of the portable electronic facility 300, such as allowing a user to vary the frequency with which a portable electronic device obtains location information using an interface 4204.

While the invention has been disclosed in connection with certain preferred embodiments, other embodiments will be recognized by those of ordinary skill in the art and are encompassed herein. All documents referenced herein are hereby incorporated by reference.

What is claimed is:

1. A method for providing incentives based on geolocation of mobile devices, the method comprising:
   storing, by a server, data comprising:
      merchant information associated with a plurality of merchants and a plurality of points of interest, and
      incentive information associated with a plurality of incentives and the plurality of merchants;
   determining, based on first communication with a mobile device of a user, a first location of the mobile device;
   determining, based on the first location, a first subset of merchants of the plurality of merchants and a first subset of incentives of the plurality of incentives associated with the first subset of merchants;
   communicating merchant data to the mobile device, the merchant data comprising information describing at least the first subset of merchants and (ii) the first subset of incentives;
   determining that the mobile device is inside a first geofence associated with at least one of the first subset of merchants; and
   communicating, in response to the determination that the mobile device is inside the first geofence, additional information describing the at least one of the first subset of merchants to the mobile device, the additional information further comprising one or more incentives, of the plurality of incentives, related to the at least one of the first subset of merchants.

2. The method of claim 1, wherein the determining the first subset of merchants is further performed based on characteristics associated with the user.

3. The method of claim 1, wherein the determining the first subset of merchants is further performed based on characteristics associated with the mobile device.

4. The method of claim 1, wherein the communicating the merchant data comprises providing one or more images for display on an interactive map interface of a web browser of the mobile device, the one or more images associated with the first subset of merchants.

5. The method of claim 1, the additional information further comprising a plurality of images for display on an interactive map interface of a user interface of the mobile device, the plurality of images associated with the at least one of the first subset of merchants.

6. The method of claim 1, further comprising:
determining the first geofence based on an area proximate to the first location.

7. The method of claim 1, wherein a plurality of geofences are associated with an area proximate to the first location, and the plurality of geofences comprises the first geofence.

8. A method for providing location-based incentives to mobile devices, the method comprising:
receiving, at a server and from a mobile device, a first communication indicating a first location of the mobile device of a user;
identifying a first subset of merchants located in an area proximate to the first location, the first subset of merchants selected from a plurality of merchants based, at least in part, on the area, wherein the plurality of merchants is associated with a plurality of incentives;
transmitting, to the mobile device, merchant data indicating at least the first subset of merchants and information describing the first subset of merchants;
determining, based on a second communication from the mobile device, that the mobile device has crossed a first geofence associated with at least one of the first subset of merchants; and
responsive to determining that the mobile device crossed the first geofence, transmitting additional information describing the at least one of the first subset of merchants to the mobile device, the additional information further comprising one or more incentives, of the plurality of incentives, related to the at least one of the first subset of merchants.

9. The method of claim 8, wherein said transmitting the additional information comprises triggering a notification on the mobile device indicating that the mobile device is proximate to the at least one of the first subset of merchants.

10. The method of claim 9, wherein said triggering the notification comprises effecting the mobile device to display, on a software user interface of the mobile device, a visual indication that the mobile device is proximate to the at least one of the first subset of merchants.

11. The method of claim 9, wherein the notification comprises an alarm for displaying on a software user interface of the mobile device, the alarm indicating the one or more incentives related to the at least one of the first subset of merchants.

12. The method of claim 8, further comprising;
accessing location and incentive data indicating:
a respective location of each of the plurality of merchants, and
a respective incentive for each of the plurality of merchants, wherein said identifying the first subset of merchants is further based on the location and incentive data.

13. The method of claim 8, further comprising:
determining the first geofence based on the area proximate to the first location.

14. The method of claim 8, wherein a plurality of geofences are associated with the area proximate to the first location, the plurality of geofences comprising the first geofence.

15. The method of claim 8, further comprising:
aggregating data from the mobile device; and
transmitting the aggregated data to a third-party system for analysis, wherein the one or more incentives are received from the third-party system based on the analysis.

16. The method of claim 8, wherein the additional information comprises one or more images for display on a user interface of the mobile device, the one or more images associated with the at least one of the first subset of merchants.

17. The method of claim 8, wherein the merchant data comprises one or more images for display on a user interface of the mobile device, the one or more images associated with the first subset of merchants.

18. The method of claim 8, further comprising:
sending an email to an email address of the user, the email based on analysis of a behavior of the user, the email comprising at least a portion of the additional information describing the at least one of the first subset of merchants.

19. A non-transitory machine-readable medium having instructions stored thereon, the instructions executable to cause performance of operations comprising:
receiving, at a server, a first communication from a mobile device of a user, the first communication indicating a first location of the mobile device;
determining, at the server, first merchants proximate to the first location, the first merchants selected from a plurality of merchants based, at least in part, on the first location, wherein the plurality of merchants is associated with a plurality of incentives accessible by the server;
communicating, to the mobile device, merchant data indicating at least the first merchants and first details describing the first merchants, the first details including first incentives of the plurality of incentives related to the first merchants;
determining, based on a second communication from the mobile device, that the mobile device has crossed into a first geofence associated with at least one merchant of the first merchants; and
responsive to determining that the mobile device crossed into the first geofence, communicating, by the server and to the mobile device, additional merchant data including additional details describing the at least one merchant, the additional details comprising one or more second incentives, of the plurality of incentives, related to the at least one merchant.

20. The non-transitory machine-readable medium of claim 19, wherein the operations further comprise:
responsive to determining that the mobile device crossed into the first geofence, triggering a notification on the mobile device indicating that the mobile device is proximate to the at least one merchant.

21. The non-transitory machine-readable medium of claim 20, wherein the notification comprises an alarm for displaying on a software user interface of the mobile device, the alarm indicating the one or more second incentives related to the at least one merchant.

22. The non-transitory machine-readable medium of claim 19, wherein the operations further comprise:
accessing location and incentive data indicating:
a respective location of each of the plurality of merchants, and
a respective incentive for each of the plurality of merchants, wherein said determining the first merchants is further based on the location and incentive data.

23. The non-transitory machine-readable medium of claim 19, wherein a plurality of geofences are associated with an area proximate to the first location.

24. The non-transitory machine-readable medium of claim 19, wherein the additional merchant data comprises one or more images for display on a user interface of the mobile device, the one or more images associated with the at least one of the first merchants.

25. A non-transitory machine-readable medium having instructions stored thereon, the instructions executable to cause performance of operations comprising:
    storing, by a server, data indicating:
        a plurality of merchants associated with a plurality of points of interest, and
        a plurality of incentives associated with the plurality of merchants;
    determining, based on first communication from a mobile device of a user, a first location of the mobile device;
    identifying, based on the first location, a first subset of merchants of the plurality of merchants and a first subset of incentives of the plurality of incentives associated with the first subset of merchants;
    transmitting merchant data to the mobile device, the merchant data comprising information describing at least the first subset of merchants and (ii) the first subset of incentives; and
    transmitting, in response to a determination that the mobile device is inside a first geofence associated with at least one of the first subset of merchants, additional details describing the at least one of the first subset of merchants to the mobile device, the additional details comprising one or more incentives of the first subset of incentives.

26. The non-transitory machine-readable medium of claim 25, wherein the identifying the first subset of merchants is further performed based on characteristics associated with the user.

27. The non-transitory machine-readable medium of claim 25, wherein the identifying the first subset of merchants is further performed based on characteristics associated with the mobile device.

28. The non-transitory machine-readable medium of claim 25, wherein the operations further comprise providing a plurality of images for display on an interactive map interface of a web browser of the mobile device, the plurality of images associated with the first subset of merchants.

29. The non-transitory machine-readable medium of claim 25, wherein the operations further comprise providing a plurality of images for display on an interactive map interface of a user interface of the mobile device, the plurality of images associated with the at least one of the first subset of merchants.

30. The non-transitory machine-readable medium of claim 25, wherein the operations further comprise determining the first geofence based on an area proximate to the first location.

\* \* \* \* \*